US005596643A

United States Patent [19]
Davis et al.

[11] Patent Number: 5,596,643
[45] Date of Patent: Jan. 21, 1997

[54] NETWORK SETTLEMENT PERFORMED ON CONSOLIDATED INFORMATION

[75] Inventors: Terry L. Davis, Scottsdale, Ariz.; James A. Hart, Radnor, Pa.; James F. Russell, Hockessin, Del.; John W. Sears, Peoria; Philip H. Trice, Phoenix, both of Ariz.

[73] Assignee: Electronic Payment Services, Inc., Wilmington, Del.

[21] Appl. No.: 581,012

[22] Filed: Jan. 3, 1996

Related U.S. Application Data

[62] Division of Ser. No. 316,662, Sep. 30, 1994.

[51] Int. Cl.⁶ .............................. H04L 9/00; H04L 9/30
[52] U.S. Cl. ................... 380/24; 380/25; 380/30
[58] Field of Search ................... 380/20, 24, 25, 380/30; 235/379, 380

[56] References Cited

U.S. PATENT DOCUMENTS

| | | | |
|---|---|---|---|
| Re. 33,571 | 4/1991 | Takahashi | 235/379 |
| 3,833,885 | 9/1974 | Gentile et al. | 340/152 R |
| 3,971,916 | 7/1976 | Moreno | 235/61.7 B |
| 4,011,433 | 3/1977 | Tateisi et al. | 235/61.7 B |
| 4,023,013 | 5/1977 | Kinker | 235/61.7 B |
| 4,068,213 | 1/1978 | Nakamura et al. | 340/149 A |
| 4,197,986 | 4/1980 | Nagata | 235/379 |
| 4,317,457 | 3/1982 | Sendrow | 380/24 |
| 4,361,754 | 11/1982 | Hoskinson et al. | 235/381 |
| 4,423,287 | 12/1983 | Zeidler | 380/24 |
| 4,458,109 | 7/1984 | Mueller-Schloer | 380/25 |
| 4,518,852 | 5/1985 | Stockburger et al. | 235/381 |
| 4,523,087 | 6/1985 | Benton | 235/380 |
| 4,575,621 | 3/1986 | Dreifus | 235/380 |
| 4,590,365 | 5/1986 | Okada | 235/379 |
| 4,629,874 | 12/1986 | Pugsley et al. | 235/380 |
| 4,683,372 | 7/1987 | Matsumoto | 235/492 |
| 4,685,131 | 8/1987 | Horne | 380/20 |
| 4,709,137 | 11/1987 | Yoshida | 235/379 |
| 4,727,244 | 2/1988 | Nakano et al. | 235/380 |
| 4,746,788 | 5/1988 | Kawana | 235/380 |
| 4,802,218 | 1/1989 | Wright et al. | 380/23 |
| 4,804,825 | 2/1989 | Bitoh | 235/380 |
| 4,816,651 | 3/1989 | Ishording | 235/379 |
| 4,853,526 | 8/1989 | Effing | 235/492 |
| 4,877,947 | 10/1989 | Mori | 235/381 |
| 4,900,903 | 2/1990 | Wright et al. | 235/380 |
| 4,906,828 | 3/1990 | Halpern | 235/379 |
| 4,959,788 | 9/1990 | Nagata et al. | 364/408 |
| 4,965,568 | 10/1990 | Atalla et al. | 380/24 |
| 5,033,021 | 7/1991 | Barakat | 364/900 |
| 5,036,461 | 7/1991 | Elliott et al. | 364/408 |
| 5,053,607 | 10/1991 | Carlson et al. | 235/379 |
| 5,140,517 | 8/1992 | Nagata et al. | 364/408 |
| 5,144,115 | 9/1992 | Yoshida | 235/379 |
| 5,175,416 | 12/1992 | Mansvelt et al. | 235/379 |
| 5,191,193 | 3/1993 | Le Roux | 235/379 |

(List continued on next page.)

*Primary Examiner*—Salvatore Cangialosi
*Attorney, Agent, or Firm*—Panitch Schwarze Jacobs & Nadel, P.C.

[57] ABSTRACT

A system for determining value in a stored value transaction system has a plurality of value storing devices. A first network consolidation device is provided for receiving stored value information from at least one of the value storing transfer devices and summarizing the received stored value information to provide a first consolidated portion of the received stored value information. A first network settlement device coupled to the first network consolidation device receives the first consolidated portion and performs settlement of the first stored value transaction network in accordance with the first consolidated portion. Further network consolidation devices each have stored value information and apply a consolidated portion of their stored value information to the first network settlement device whereby a plurality of consolidated portions are applied to the first network consolidation device. The first network settlement device performs settlement of the first stored value transaction network in accordance with the plurality of consolidated portions. A differing portion of the received stored value information is transferred to a storage device.

3 Claims, 21 Drawing Sheets

U.S. PATENT DOCUMENTS

| | | |
|---|---|---|
| 5,202,989 | 4/1993 | Hirosawa et al. . |
| 5,227,612 | 7/1993 | Le Roux .................... 235/379 |
| 5,231,666 | 7/1993 | Matyas ...................... 380/25 |
| 5,239,166 | 8/1993 | Graves ....................... 235/380 |
| 5,265,007 | 11/1993 | Barnhard, Jr. et al. . |
| 5,285,382 | 2/1994 | Muehlberger . |
| 5,287,268 | 2/1994 | McCarthy . |
| 5,309,363 | 5/1994 | Graves et al. ............ 235/380 |
| 5,432,326 | 7/1995 | Noblett, Jr. . |
| 5,440,634 | 8/1995 | Jones . |
| 5,453,601 | 9/1995 | Rosen . |
| 5,455,407 | 10/1995 | Rosen . |
| 5,465,206 | 11/1995 | Hilt et al. . |

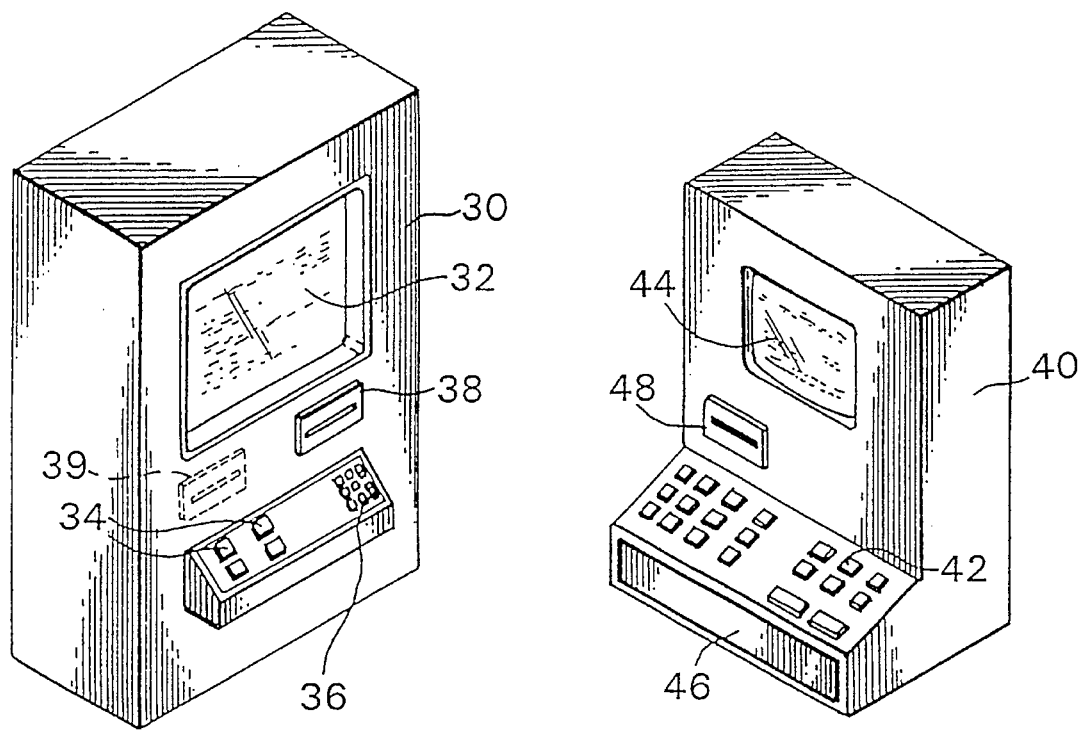
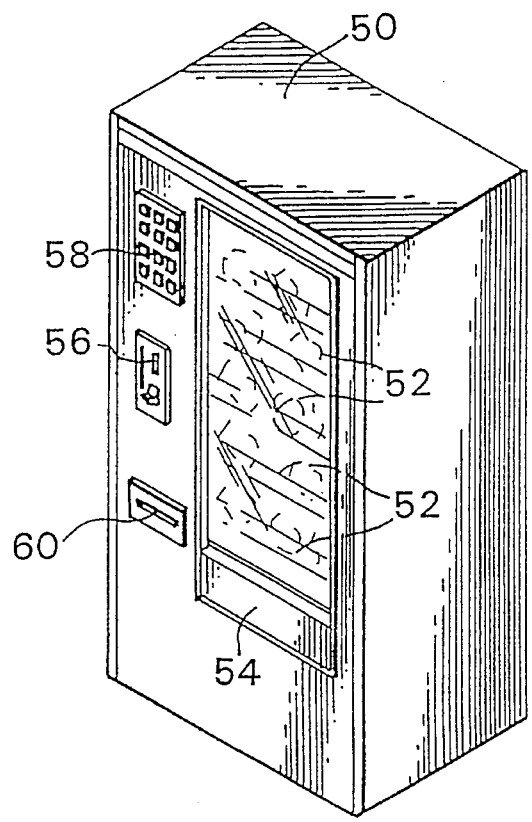
FIG. 2

| Digital Encryption Standard Keys | SVC 20 | Security Module 78 | Collection Card 420 | Control Unit 420 | Collection System 424 | Consolidation System 436 |
|---|---|---|---|---|---|---|
| Verification | dKv | mKv   dKv | dKv | dKv | mKv | mKv |
| Authorization | dKa | | | | | mKa |
| Issuer Signature | dKis | | | | | |
| Acquirer Signature | | dKas | | | | MKas |
| Public Keys | | | | | | |
| | | PKna | | PKna | PKna | PKna |
| | | SKdev | | SKctrl | SKcs1 | SKcs2 |
| | | PKdev | | PKctrl | PKcs1 | PKcs2 |
| Network Authority Secret Key Signature | SigDevId & Public | SigDevID & Public | SigCOLId & Public | SigCCID & Public | SigCS1Id & Public | SigCS2Id & Public |

FIG. 13E

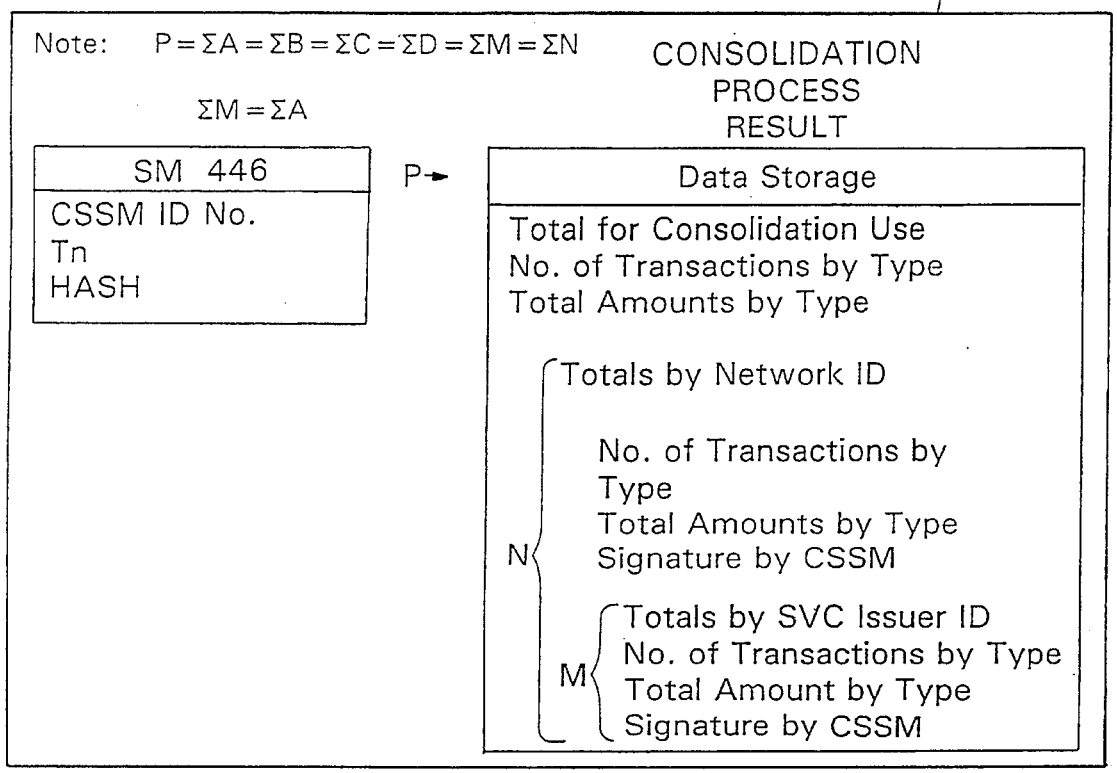

446

CONSOLIDATION PROCESS RESULT

Note: $P = \Sigma A = \Sigma B = \Sigma C = \Sigma D = \Sigma M = \Sigma N$ $\Sigma M = \Sigma A$ SM 446
- CSSM ID No.
- Tn
- HASH

P→

Data Storage
- Total for Consolidation Use
- No. of Transactions by Type
- Total Amounts by Type N {
- Totals by Network ID
- No. of Transactions by Type
- Total Amounts by Type
- Signature by CSSM M {
- Totals by SVC Issuer ID
- No. of Transactions by Type
- Total Amount by Type
- Signature by CSSM

FIG. 13F

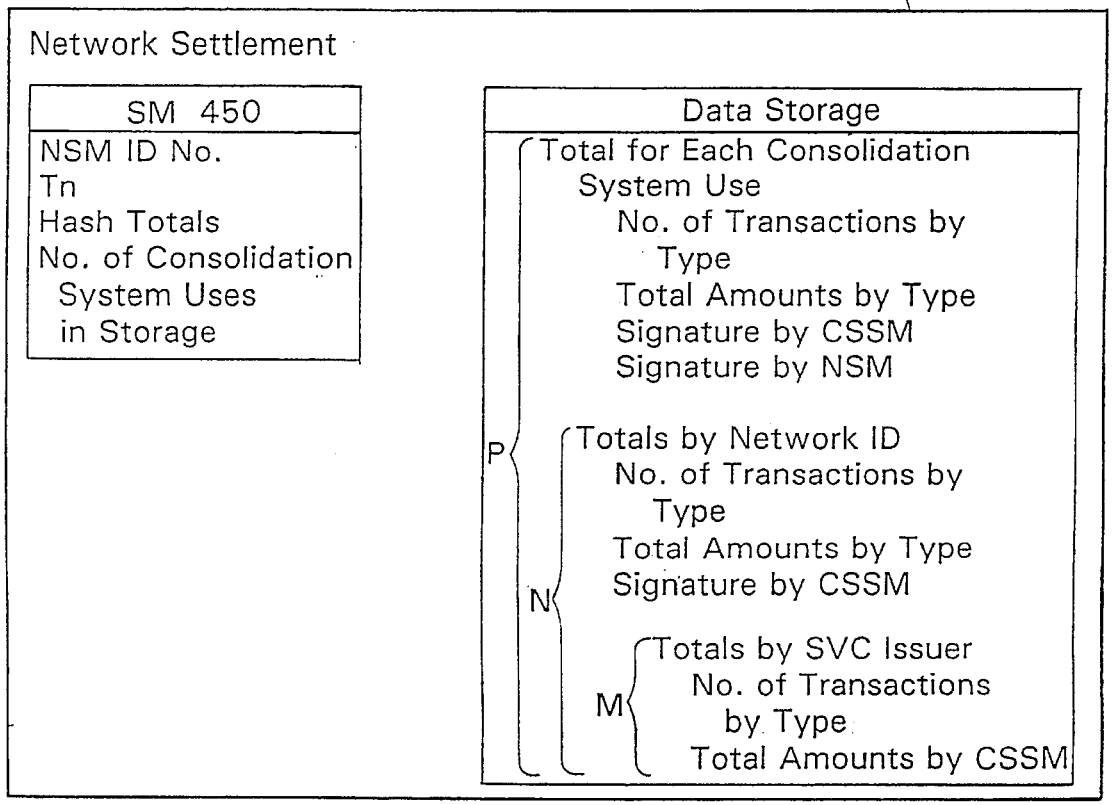

448

Network Settlement

SM 450
- NSM ID No.
- Tn
- Hash Totals
- No. of Consolidation System Uses in Storage Data Storage
- Total for Each Consolidation System Use
  - No. of Transactions by Type
  - Total Amounts by Type
  - Signature by CSSM
  - Signature by NSM P {
N {
- Totals by Network ID
  - No. of Transactions by Type
  - Total Amounts by Type
  - Signature by CSSM M {
- Totals by SVC Issuer
  - No. of Transactions by Type
  - Total Amounts by CSSM

NETWORK SETTLEMENT PERFORMED ON CONSOLIDATED INFORMATION

This is a division of application Ser. No. 08/316,662, filed Sep. 30, 1994 pending.

BACKGROUND OF THE INVENTION

The present invention relates generally to automated systems for performing transactions, such as financial transactions, using an integrated circuit device or card and, more particularly, to such transaction systems and methods of utilizing such transaction systems in a convenient and secure manner to permit such an integrated circuit device or card to be used in place of cash for the purchase of goods and/or services.

Goods and/or services are generally purchased by consumers and others utilizing credit cards, debit cards and/or cash or its equivalents, i.e., checks, money orders and bank drafts. Credit and debit cards have been used only relatively recently for this purpose. Cash, both coin and currency, has been the primary medium of exchange for goods and services for centuries. During the entire time, problems such as theft, fraud, counterfeiting and short-changing have always been present.

The present invention comprises a transaction system for integrated circuit devices, more particularly, integrated circuit cards or "smart cards" which are employed in the transaction system as a substitute for cash (i.e., currency or coins). The system of the present invention is superior to the use of cash because the transfer of value from the card for the purchase of goods or services occurs in an automated manner without the need to produce, transport, store or secure currency or coins. With the transaction system of the present invention, the integrated circuit card is as simple and as easy to use as cash and yet all transactions are secure and self-validating.

With the present invention, financial institutions and other entities issue one or more integrated circuit cards to each system user or cardholder. A cardholder, utilizing a specialized automated terminal, loads "value" in the form of a cash or dollar balance onto the integrated circuit card by debiting an existing financial account, such as a checking, savings, or money market account, or by inserting cash into the terminal. Thereafter, the cardholder may use the integrated circuit card to purchase virtually any type of goods and/or services.

When a cardholder wishes to purchase goods and/or services, the integrated circuit card is inserted into a terminal at the point of purchase or sale of the desired goods and/or services. After an automatic verification and validation process takes place, the cardholder may purchase goods and/or services by having the cost of the goods and/or services deducted from the balance stored in the integrated circuit card. The card is then removed from the terminal for subsequent purchases and/or loading of value.

SUMMARY OF THE INVENTION

A system for determining value in a stored value transaction system has a plurality of value storing devices. A first network consolidation device is provided for receiving stored value information from at least one of the value storing transfer devices and summarizing the received stored value information to provide a first consolidated portion of the received stored value information. A first network settlement device coupled to the first network consolidation device receives the first consolidated portion and performs settlement of the first stored value transaction network in accordance with the first consolidated portion.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 2 is a representation of stored value devices which may operate within the stored value transaction system of the present invention;

FIG. 10 is a table of the digital encryption standard keys used in the cryptography of the system of the present invention;

FIGS. 13A–13I are data structures suitable for the information representative of transferred value for the devices of the stored value system of FIG. 4 including representations of the stored value information files collected within various stored value transfer devices.

DETAILED DESCRIPTION OF PREFERRED EMBODIMENT

Figure 1:
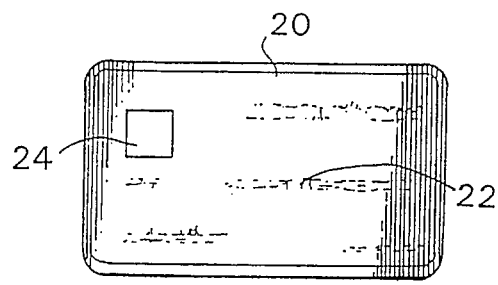
FIG. 1 is a representation of an integrated circuit stored value card for use within the stored value transaction system of the present invention.

Referring to the drawings, wherein like numerals are used to indicate like elements throughout the several figures, there is shown in FIG. 1 a stored value card (SVC) 20 for use in a presently preferred embodiment of a financial-based transaction system in accordance with the present invention. It should be appreciated by those skilled in the art that while a financial-based transaction system is shown and described, the present invention is not so limited and could encompass other, non-financial transaction systems including identification or access control systems (not shown). A more detailed description of a transaction system wherein the present invention may be advantageously applied is found in Davis et al. Transaction System for Integrated Circuit Cards; U.S. patent application Ser. No. 08/255,612, filed Jun. 9, 1994 which is incorporated by reference herein.

As shown in FIG. 1, the SVC 20 is a portable integrated circuit (IC) device comprised of a generally flat, rectangular, card-like substrate 22 having two principal surfaces which is preferably formed of a polymeric material but may be formed of some other material or of composite materials if desired. In the presently preferred embodiment, the substrate 22 has an overall size which is substantially the same as a standard or typical credit or debit card and is formed of substantially the same polymeric material. However, the particular size, shape and material composition of the substrate may vary if desired. One or both principal surfaces of the substrate 22 may include embossed or imprinted indicia such as the name of a financial entity which has issued the SVC 20, or the IC device 20, to a cardholder, the name of the cardholder to which the IC device 20 has been issued, an effective and/or expiration date of the SVC 20 or the IC device 20, an account number or other number used by the issuing entity or the like. A magnetic stripe (not shown) of the type generally well known and commonly used in credit cards, debit cards and the like, may also be incorporated into one or both principal surfaces of the substrate 22 in a manner well known in the art and any such magnetic stripe may include identification and other types of data stored in a manner well known in the art.

The substrate 22 in the present embodiment further includes an integrated circuit or chip 24 embedded therein. The integrated circuit 24 in the present embodiment includes a processor or a microprocessor, memory, including random access memory and a more permanent, or non-volatile form of memory such as an EPROM, EEPROM or other type of PROM, as well as a plurality of electrical contacts (not shown) conveniently located to facilitate the establishment of a direct mechanical type of electrical connection between the integrated circuit 24 and other elements of the transaction system in a manner which will hereinafter be described. It will be appreciated that while mechanical contact type electrical connections are presently preferred, other non-mechanical contact technologies (not shown) may be alternatively employed for establishing communication for the transfer of signals and data between the integrated circuit 24 and other system elements. The non-volatile memory of the integrated circuit 24 also preferably includes a stored operating system program and certain stored data.

Further details of the physical structure of the SVC 20 and, more particularly, the integrated circuit 24 are not necessary for a complete understanding of the present invention and are not provided herein. Such details may be obtained from a variety of other sources including printed publications, issued U.S. and other patents, as well as from various manufacturers of stored value cards. In the presently preferred embodiment, the SVC 20 is a general purpose, reusable smart card available from GemPlus. Further, more specific details concerning the operation of the integrated circuit 24 and the method of use of the SVC 20 will hereinafter become apparent.

In the transaction system of the present invention, the SVC 20 is used as a substitute for cash (currency or coins) as a medium of exchange for a cardholder to obtain goods and/or services from a variety of sources. Thus, instead of or in addition to carrying cash, a cardholder carries the SVC 20 which includes, within its memory, at least one electronic purse which, when loaded with value in a manner which will hereinafter be described, may be conveniently used for the purchase of goods and/or services in place of cash. For purposes of the present description, the SVC 20 is assumed to have a single electronic purse, but it should be understood that multiple identifiable electronic purses which may be used for particular applications may be provided.

FIG. 2 shows examples of three different types of automated terminals or value storing devices with which the SVC 20 may be employed. A load value terminal 30 is employed for the purpose of loading value into the electronic purse of the SVC 20. The load value terminal 30 as illustrated in FIG. 2, is generally similar in appearance to a standard automatic teller machine (ATM) of the kiosk or standalone type. In some applications, an existing ATM may be modified to function as a load value terminal. It will be appreciated by those skilled in the art that the load value terminal 30 may take on many other forms such as a countertop or tabletop terminal and, therefore, the particular embodiment of the load value terminal 30 shown in FIG. 2 should not be considered to be limiting.

The load value terminal 30 preferably includes a display device 32 which may be a cathode ray tube (CRT) as illustrated or, alternatively, may comprise a liquid crystal display (LCD), light emitting diode (LED) display, or any other type of display device employed for displaying or otherwise communicating information from the load value terminal 30 to a cardholder. The load value terminal 30 also includes input means for permitting a cardholder to provide information to the load value terminal 30. In the illustrated embodiment, the input means comprises a plurality of activity selection contacts or buttons 34 and a typical or standard ten-digit numerical keypad 36, both of a type well known to those skilled in the art. It will be appreciated that while the input means 34, 36 are illustrated as being individual buttons and/or a keypad on the front of the load value terminal 30, other types of input means, such as on-screen or touch screen input means or the like may be employed in the alternative.

The load value terminal 30 also includes an opening or slot 38 for receiving the SVC 20. The card receiving slot 38 is part of a reader/writer device (not shown in FIG. 2) which is employed in the present embodiment to engage and hold the SVC 20 within the terminal 30 and to establish and maintain communication, in the present embodiment, an electrical connection between the terminal 30 and the integrated circuit 24 of the SVC 20. The load value terminal 30, in some embodiments, may also include a currency receiver/reader 39, illustrated in phantom in FIG. 2. The currency receiver/reader 39 is adapted to receive, read and verify currency, for example, dollar bills, for use in loading value onto the SVC 20 in a manner which will hereinafter be described. Currency receiver/readers are well known in the art and need not be described in greater detail in order to understand the present invention.

In operation, the SVC 20 is inserted by a cardholder into the card receiving slot 38 of the load value terminal 30 and is engaged and held by the reader/writer device within the terminal 30. Once the electrical connection is established between the SVC 20 and the load value terminal 30 and the validity of the SVC 20 and the terminal 30 have been verified in a manner to establish a "verified session" or "secure session", instructions for loading value onto the SVC 20 are provided to the cardholder on the display device 32. Using the selection buttons 34 and the numerical keypad 36 or other such input means, the cardholder selects the manner in which value, i.e., a selected cash balance, is to be loaded onto the SVC 20 and the total amount of value to be loaded. Value can be loaded by inserting currency into the currency receiver/reader 39 if the load value terminal 30 is so equipped. Alternatively, value can be loaded onto the SVC 20 by deducting a corresponding cash value from an established and identified account, such as a designated savings or checking account, of the cardholder in a manner which will hereinafter be described in greater detail. Typically, the load value terminal 30 is in communication with one or more financial entities with access to the designated account of the cardholder for authorization of the transfer of value to the SVC 20. Once the desired authorized amount of cash value has been loaded by the load value terminal 30 onto the SVC 20 (i.e., into the memory of the integral circuit 24), the SVC 20 is released by the terminal 30 and the cardholder removes the SVC 20 from the card receiving slot 38 and, thereafter, uses the SVC 20 to purchase goods and/or services as hereinafter described.

The SVC 20 may be used for the purchase of all types of goods and/or services in substantially the same way that cash or money is used. Thus, for example, the SVC 20 may be used by a cardholder to purchase groceries from a supermarket, to purchase food items or other items from a vending machine, to purchase food at a restaurant, to pay the fare for a bus ride or other transportation services, to pay tolls on a toll road, to pay for a telephone call or the like. The purchase of such goods and/or services is accomplished by transferring cash value which is stored in the memory of the integrated circuit 24, from the SVC 20 to a terminal having the capability of receiving and interfacing with the SVC 20 to facilitate the transfer of cash value corresponding to the value or cost of the goods and/or services purchased by a cardholder. FIG. 2 illustrates only two such terminals, a point of sale (POS) terminal 40 and a vending machine terminal 50. It will be appreciated by those skilled in the art that while only two specific types of terminals are illustrated in FIG. 2, many different types of terminals may be employed for receiving and transferring value from a SVC 20. Accordingly, the two typical terminals specifically illustrated and hereinafter discussed should not be considered to be a limitation upon the present invention.

The POS terminal 40 illustrated in FIG. 2 is similar in structure and appearance to a standard electronic cash register. More specifically, the POS terminal 40, which, in the present embodiment, preferably is computer controlled, includes a standard keyboard 42 having both numeric and specialized keys typical of the type employed in an electronic cash register. The POS terminal 40 may also include a fixed or hand-held scanner (not shown) such as a bar code scanner of the type in use with many electronic cash registers. Other means for the entry of pricing or other information may be employed in the POS terminal 40. A display screen 44, such as a CRT or other display device also typical of an electronic cash register is provided. In some applications, no display device is required. The POS terminal 40 may also include an openable drawer 46, such as a cash drawer or the like, which allows the terminal 40 to also effectively handle transactions involving cash, checks, credit cards or the like.

The POS terminal 40 also includes an opening or slot 48 for receiving the SVC 20 to facilitate transfer of value from the SVC 20 to the POS terminal 40. The card receiving slot 48 is part of a reader/writer device (not shown in FIG. 2) which is employed to engage and hold the SVC 20 within the POS terminal 40 and to establish and maintain communication, in the present embodiment, a mechanical type electrical connection, between the terminal 40 and the SVC 20. Preferably, the POS terminal 40 includes a processor or microprocessor (not shown) which uses a stored operating program to interact with the SVC 20 for the transfer of value. The POS terminal 40 as described may be employed in virtually any type of wholesale, retail or other facility in which virtually any type of goods (i.e., food, clothing, cleaning supplies, hardware, appliances, etc.) may be purchased or where any type of services (i.e., restaurant services, video rentals, dry cleaning services, car wash services, etc.) may be purchased. Typically, such a POS terminal 40 will be located in the same place in which a cash register is located, typically at or near an entrance or exit to a facility but the POS terminal 40 could be at some other location, for example, within a particular area or department of a retail or other facility, if desired.

In use, when a holder of the SVC 20 desires to pay for selected goods and/or services, typically when leaving a retail or other facility, a clerk or other person associated with the facility enters the cost of the goods or services as well as any other requisite information (i.e., department or item codes) into the POS terminal 40 using the entry keys of the keyboard 42, a scanner (not shown), or any other type of data entry device. Once the cost of the goods and/or services and/or other requisite information has been entered and is totaled, the SVC 20 is inserted into the card slot 48 on the POS terminal 40. It will be appreciated that while the card receiving slot 48 in the embodiment illustrated in FIG. 1 is shown as being incorporated in the front surface of the POS terminal 40, the card slot 48 could be in some other location such as on the customer side of the POS terminal 40 or at a remote location, such as on the side of a check-out counter associated with the POS terminal 40. In some applications, the SVC 20 may be inserted into the card slot 48 before or during the time that the cost and/or other information is entered. In some applications, the cardholder may enter the cost and/or other information into the POS terminal 40. Regardless of where the card receiving slot 48 is located and when the SVC 20 is inserted, when the SVC 20 is inserted into the card receiving slot 48, a verification process is performed (described in detail hereinafter) to establish a secure session between the SVC 20 and the POS terminal 40 and the total value of the purchased goods and/or services is thereafter deducted from the available cash value balance stored within the memory of the SVC 20 and the transaction is logged or stored within the memory of the POS terminal 40. Once the transfer of value from the SVC 20 to the POS terminal 40 has been completed, the SVC 20 is released by the POS terminal 40 and is removed by the cardholder or facility clerk from the card receiving slot 48 thereby completing the purchase of the goods and/or services. Of course, the amount transferred from the SVC 20 for the goods and/or services being purchased must be less than or equal to the total amount of cash value stored within the memory of the SVC 20.

The vending machine terminal 50 comprises essentially a standard stand alone-type vending machine having a housing containing a plurality of individual items 52 which may be dispensed through a dispensing opening 54 proximate the lower portion of the vending machine terminal 50. The vending machine terminal 50 may also include a standard coin and/or bill receiving device 56 to permit coins or currency to be used for the purchase of selected items 52. A plurality of selector buttons 58 are provided to permit a purchaser to select, typically using an alphanumeric coding scheme, which one of the various items 52 is to be dispensed. Finally, the vending machine terminal 50 includes a card receiving slot 60 which is employed for receiving the SVC 20. The card receiving slot 60 is part of a reader/writer device (not shown in FIG. 1) which is employed to engage and hold the SVC 20 within the vending machine terminal 50 and to establish and maintain communication, in the present embodiment, a mechanical type electrical connection, between the vending machine terminal 50 and the SVC 20. Preferably, the vending machine terminal 50 includes a processor or microprocessor which uses an operating program stored in memory to interact with the SVC 20 for the transfer of value to enable the dispensing of one or more items 52.

In operation, to obtain a selected item 52 from a vending machine terminal 50, a holder of the SVC 20 inserts the SVC 20 into the card receiving slot 60. After a verification procedure has been completed to establish a secure session, the selection buttons 58 are enabled to permit the cardholder to select one or more items 52 to be dispensed, consistent with the cash value available within the SVC 20. As an item 52 is dispensed, the cost of the dispensed item is deducted from the available balance of the cash value stored within the memory of the SVC 20 and the transaction is logged or stored within the memory of the vending machine terminal 50. Thereafter, the SVC 20 is released and the cardholder may remove the dispensed item through the dispensing opening 54 and may remove the SVC 20 from the card receiving slot 60.

Structures similar to the two described terminals 40, 50 are used and similar procedures are employed when the SVC 20 is used for the purchase of other types of goods and/or services with other types of terminals (not shown). Each such terminal includes some type of card receiving slot or other device employed for establishing communication between the SVC 20 and the terminal and some type of computer controlled means for verification or authentication purposes and for transferring cash value from the memory of the SVC 20 to the applicable terminal corresponding to the cost of the goods and/or services being purchased by a cardholder. A complete description of the structure and operation of such additional terminals is not believed to be necessary for a complete understanding of the present invention and, therefore, will not be presented. It should be appreciated by those skilled in the art that the present invention is not limited to the terminals 40, 50 specifically discussed above and shown on FIG. 1.

Figure 3:
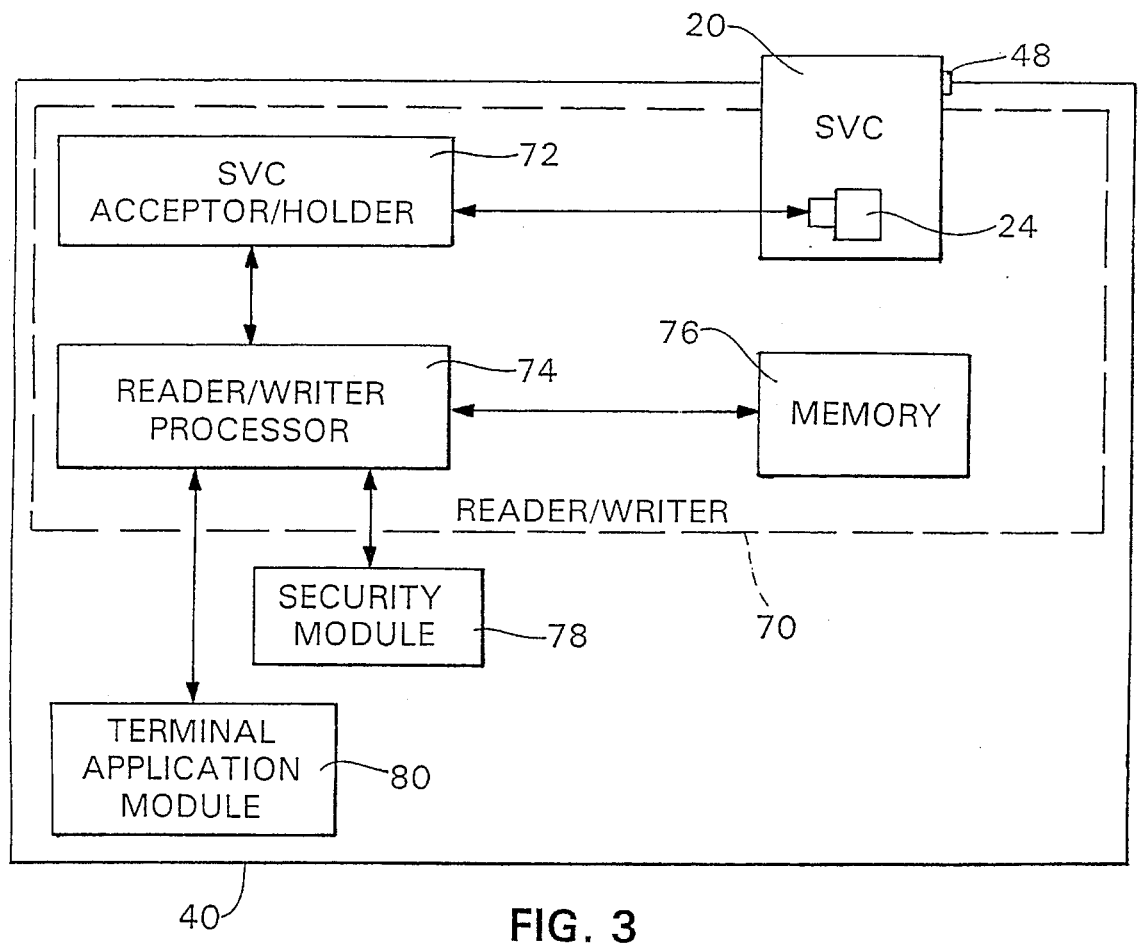
FIG. 3 is a functional schematic block diagram of a preferred embodiment of a point of sale terminal in accordance with the present invention.

FIG. 3 is a more detailed functional schematic block diagram of a portion of the POS terminal 40, illustrating in greater detail the functional hardware and firmware elements of the POS terminal 40 employed for interfacing with the SVC 20 and for verification purposes. It will be appreciated that, while for purposes of describing the present embodiment, the functional aspects of the POS terminal 40 are illustrated, the same or essentially the same structural and operational elements are present in other types of terminals with which the SVC 20 interfaces for the transfer of value. In addition, it will be appreciated that such other terminals with which the SVC 20 interfaces for the transfer of value also function in substantially the same manner as will hereinafter be described with respect to the pertinent portions of the POS terminal 40. Thus, the POS terminal 40 has been selected merely for the purpose of illustration and is not considered to be a limitation on the present invention.

The POS terminal 40 includes a reader/writer device 70 comprised of the hardware and software necessary to communicate with and to read from and write to a SVC 20, more particularly, the memory within the integrated circuit 24. The reader/writer device 70 includes a SVC acceptor/holder 72, a processor 74, and, in the present embodiment, its own memory 76, although it may share a memory with another component. The SVC acceptor/holder 72 includes the card slot 48 of the POS terminal 40 and functions to engage and hold the SVC 20 which is inserted by a cardholder or other person through the card slot 48. The SVC acceptor/holder 72 continues to hold the SVC 20 in position until the transaction between the SVC 20 and the POS terminal 40 has been completed. Hardware devices employed for the purpose of receiving and holding smart cards, credit cards, and other types of cards in this manner are well known in the art and are available from several manufacturers. Complete details of the structure and operation of the SVC acceptor/holder 72 are not necessary for complete understanding of the present invention and, therefore, are not set forth herein. Such details are available from the manufacturers of such card acceptor/holder devices such as Danyl Corporation or VeriFone Inc.

The SVC acceptor/holder 72, in addition to engaging and holding the SvC 20 within the POS terminal 40, in the present embodiment, includes contact means (not shown) for engaging the contacts associated with the integrated circuit 24 of the SVC 20 to establish a direct mechanical contact electrical connection with the SVC 20, more particularly, with the integrated circuit 24. The contact means (not shown) of the SVC acceptor/holder 72 are suitably positioned so that when the SVC 20 is properly engaged and held by the SVC acceptor/holder 72, the contact means are properly aligned with contacts (not shown) of the integrated circuit 24 on the SVC 20 to provide the requisite electrical connection. Contact means of this type are also well known in the art and, therefore, a complete description of the structure and operation of such contact means is not necessary for an understanding of the present invention. In addition, it should be appreciated that while a direct mechanical type electrical connection is established in the present embodiment, other contact or contactless methods of establishing a communication link or path between the integrated circuit 24 of the SVC 20 and the terminal could be employed if desired.

The SVC acceptor/holder 72 communicates with the reader/writer processor 74 thereby effectively placing the SVC integrated circuit 24 in communication with the reader/writer processor 74. The reader/writer processor 74 also communicates with the memory 76. The memory 76 includes both random access memory as well as non-volatile read-only memory such as an EEPROM or the like. The memory 76 is employed by the reader/writer 70 for the storage of an operating program as well as specific transaction logging, transaction signature and other data of a type which will hereinafter be described in greater detail. The reader/writer processor 74 is also employed to control the establishment of a secure session between the SVC 20 and the POS terminal 40.

A security module 78 also communicates with the reader/writer processor 74 for cooperating with the reader/writer processor 74 in establishing a secure session with the SVC 20. The security module 78 is preferably located within the POS terminal 40 and may be physically positioned within the reader/writer device 70 if desired. The security module 78 could be at a location remote from the POS terminal 40 in some applications. In the presently preferred embodiment, the security module 78 is formed of at least a portion of a integrated circuit (IC) card, more particularly, a GemPlus MCOS24K card. It will be recognized that the security module 78 could be implemented with other technologies, particularly if remotely located. The requisite portion of the IC card which forms the security module 78 includes at least a portion of the substrate and the integrated circuit. The IC card used to form the security module 78 may be physically located within a holder device (not shown) which mechanically engages the contacts of the security module IC card in order to provide an electrical connection between the contacts of the security module IC card and the reader/writer processor 74. In order to simplify the following description of the operation of the POS terminal 40 in establishing a secure session, the security module IC card and/or integrated circuit will be referred to merely as the security module 78.

As with the SVC 20, in the present embodiment, the security module 78 includes a processor or microprocessor, memory, including random access memory, and a more permanent or non-volatile form of memory such as an EPROM, EEPROM, or other type of PROM as well as the requisite contacts for establishing the electrical connection with the reader/writer processor 74. The memory also includes an operating system program and certain stored data hereinafter described in greater detail.

As discussed above, in order to use the SVC 20 to conduct a financial or other transaction with a terminal such as the POS terminal 40, it is first necessary to establish a secure session between the SVC 20 and the terminal 40. A secure session is established after an automatic dual challenge procedure between the SVC 20 and the security module 78 under the direction and control of the reader/writer processor 74 successfully verifies that both the SVC 20 and the POS terminal 40 (including the security module 78) are mutually validated to perform interactions involving the transfer of value. Establishing a secure session includes establishing a one time session key which is maintained only in the SVC 20 and in the security module 78 and is used for encrypting certain information passing between the SVC 20 and the POS terminal 40 only for the remainder of the particular secure session, usually one complete financial or other transaction. Of course, the value transferred is still limited by the amount of cash value stored in the memory of the SVC 20.

A terminal application module 80 is included as an interface between the reader/writer processor 74 and the remainder of the POS terminal 40. Essentially, the remainder of the POS terminal 40 is a standard electronic cash register, described generally above with respect to FIG. 2, or some other type of standard electronic device used for entering and totaling the cost of the goods and/or services being purchased by the cardholder. The terminal application module 80 provides a convenient interface for passing the total cost information from the standard portion of the POS terminal 40 to the reader/writer processor 74. The reader/writer processor 74, in turn, effectively deducts the total cash value of the transaction from the balance in memory of the SVC 20 and effectively transfers the corresponding cash value to the terminal 40.

Once the value has been transferred from the SVC 20, the reader/writer processor 74 also obtains from the SVC 20 a transaction signature which is stored in the reader/writer device memory 76 to establish a secure audit trail or log for later verification of each transaction between the SVC 20 and the POS terminal 40. A separate transaction signature is also obtained from the security module 78 for each such transaction and is also stored in the reader/writer device memory 76 also to establish a secure audit trail or log for later verification of each transaction between an SVC 20 and the POS terminal 40. Both of the transaction signatures are stored in the memory 76 at locations which are related to a transaction log stored in the memory 76 as a result of the corresponding transfer of value. Once the transaction signatures have been received and stored, the reader/writer processor 74 signals the SVC acceptor/holder 72 to power down the SVC 20 and release it thereby ending the secure session and permitting a cardholder or other person to remove the SVC 20 from the card slot 48.

A transaction system of the type described for transferring value in exchange for goods and services must be completely trustworthy in order to function effectively. Thus, all transactions that occur within such a transaction system must be secure and complete detailed audit trails of all such transactions must be maintained by the system. In the present transaction system, the integrated circuit 24 of the SVC 20 and the integrated circuit within security module 78 have inherent security features that prevent observers and would-be thieves from determining precisely what steps are being performed within these components. For example, the processors of both the SVC 20 and the security module 78 are passive and subservient to the reader/writer processor 74 and, therefore, only function under program instructions from the reader/writer microprocessor 74. In addition, all interaction between the SVC 20 and a reader/writer processor 74 begins with a dual-challenge, cross-verification procedure to establish a secure session as a result of positive confirmation that both the SVC 20 and the terminal (security module 78) are validated for the performance of a financial or other transaction. The secure session is established utilizing data stored within the memory of the SVC 20 and the memory of the security module 78.

In the presently preferred embodiment, all encrypted data is preferably encrypted utilizing a standard data encryption algorithm in accordance with a well known data encryption standard (DES). The data encryption algorithm allows plain text or unencrypted data to be converted into unreadable cipher text or encrypted data using one or more cryptographic keys. The process of converting plain text data into encrypted data is called encryption and the reverse process is called decryption. DES cryptographic keys are eight-byte entities of which the least significant seven bits of each byte are used, resulting in a fifty-six bit key. The standard DES algorithm is a complex process that shifts and merges individual bits of the plain text data as directed by the bits of the key being used. The result of the encryption process is a binary data block that bears no discernible relationship to the original unencrypted data and can only be decrypted using the DES algorithm and the cryptographic keys used in the encryption process. It will be appreciated that in some instances it may be advantageous to use only a portion of the encrypted data.

A complete understanding of the encryption process and, particularly, the DES algorithm is not necessary for an understanding of the present invention. Essentially, the present invention is operable with virtually any type of DES algorithm, public key or any other cryptographic algorithm or essentially any cryptographic keys.

A secure session is established in the present invention by separate encryption of certain data by both the SVC 20 and the security module 78 utilizing, in the present embodiment, a standard DES algorithm and certain encryption keys which are stored in the SVC 20 and in the security module 78. All or selected portions of the separately encrypted data are then separately compared for confirmation purposes. In order to provide enhanced security a multiple encryption procedure is used. A first set of DES master keys includes the first or basic keys used for the encryption process. The master keys are never stored within either the SVC 20 or the security module 78. Instead, the master keys are maintained by a card issuing entity in a highly secure location. The master keys themselves are used to generate a plurality of derived keys utilizing a DES encryption algorithm. Such derived keys are called control keys herein. Because the security module 78 is in a relatively secure environment, some of the control keys are stored within the memory of the security module 78. However, in the SVC 20, the control keys are used with the DES algorithm, and an identification code or number, more particularly, in the present embodiment, a serial number, assigned to each individual SVC 20 to provide derived keys which are stored within the SVC 20. In this manner, each individual SVC 20 has its own set of derived keys and the derived keys stored in each SVC are different from the derived keys stored in every other SVC. A derived key selected by the reader/writer processor 74 is used by the SVC along with other data to create and verify a non-repeating, non-reusable session key which is then used for encrypting certain transaction data and information passing between the SVC 20 and the POS terminal 40. In the presently preferred embodiment of the invention, there are several categories of derived keys which are stored within the SVC 20 including verification keys, authorization keys, etc. In addition, a plurality of each category of the derived keys is stored within the SVC 20. Correspondingly, a plurality of different categories of control keys and derived keys are stored within the security module 78 with a corresponding plurality of some categories of the keys being stored. To further enhance security, the reader/writer processor 74 selects which of the keys in each category is to be used for each secure session, the selection being made on a random or rotating basis or any other desired basis.

In order to facilitate the establishment of a secure session, as well as the generating of the above-described transaction signatures, both the SVC 20 and the security module 78 contain additional stored data. In the preferred embodiment, the following data is preferably stored within the memory of the SVC 20:

(1) the one-of-a-kind identification number or serial number which is assigned to each SVC 20;

(2) a transaction count, a number which starts at zero and is incremented each time a transaction is conducted using the SVC 20;

(3) a derived password or number; and (4) an identification number (different from the serial number) associated with a financial institution or other entity which issues the SVC.

Figure 4:
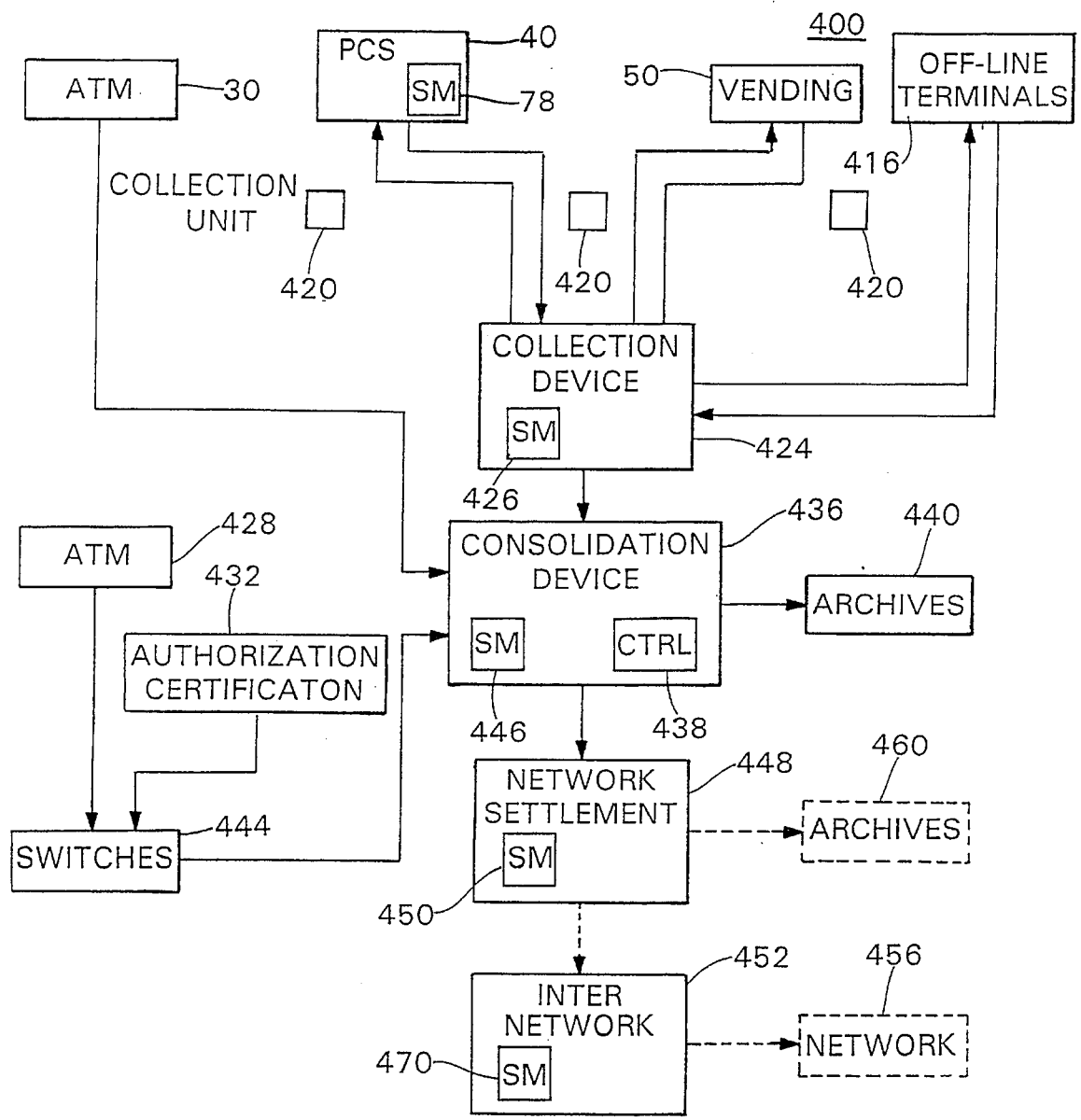
FIG. 4 is a block diagram representation of a transaction system for collection of stored value in the system of the present invention.
Figure 5A:
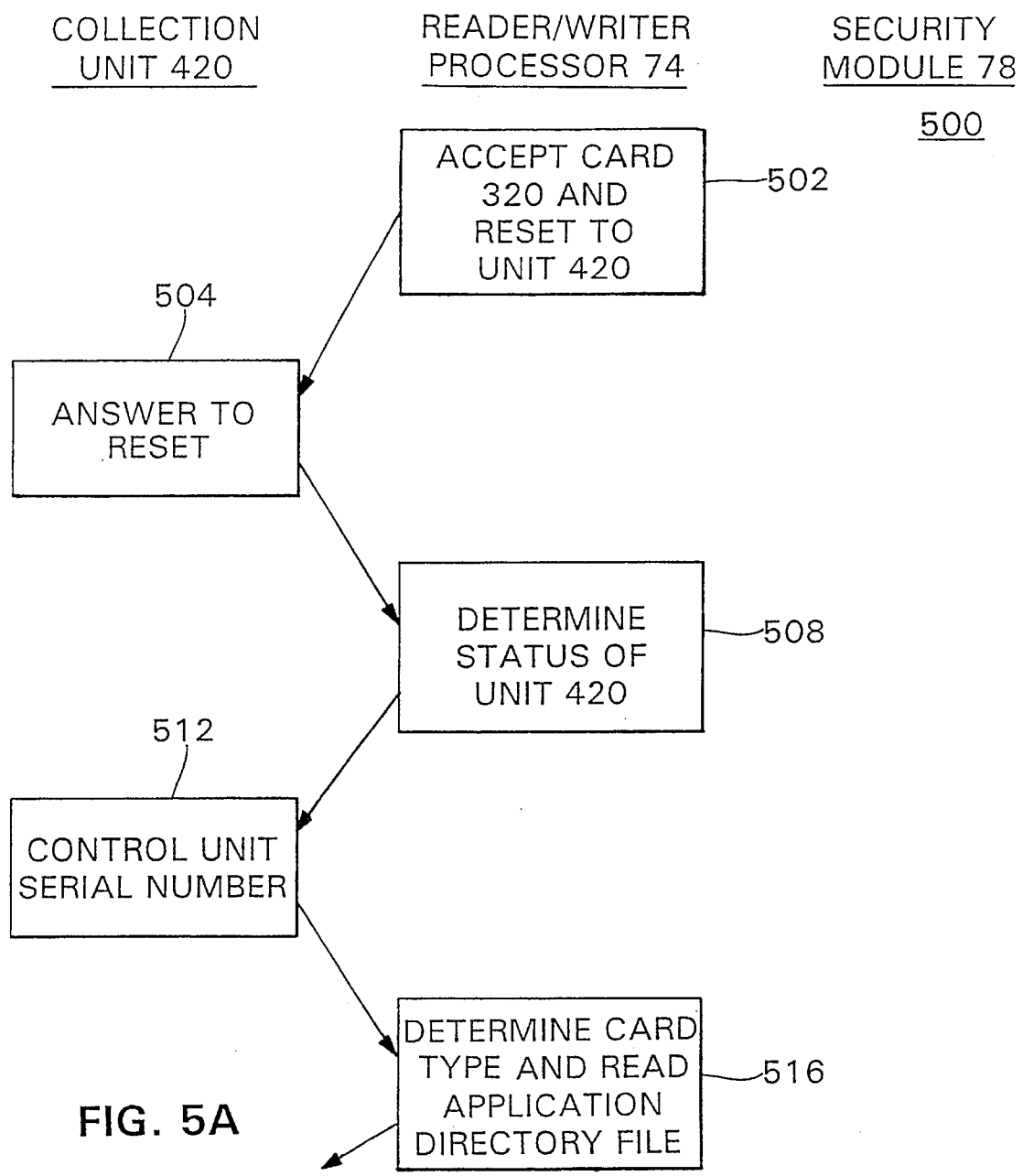
FIGS. 5A–5D are a partial flow diagram of the preferred value transfer protocol for generating and verifying the collection dialog and unloading the controls dialog in accordance with the present invention.
Figure 5B:
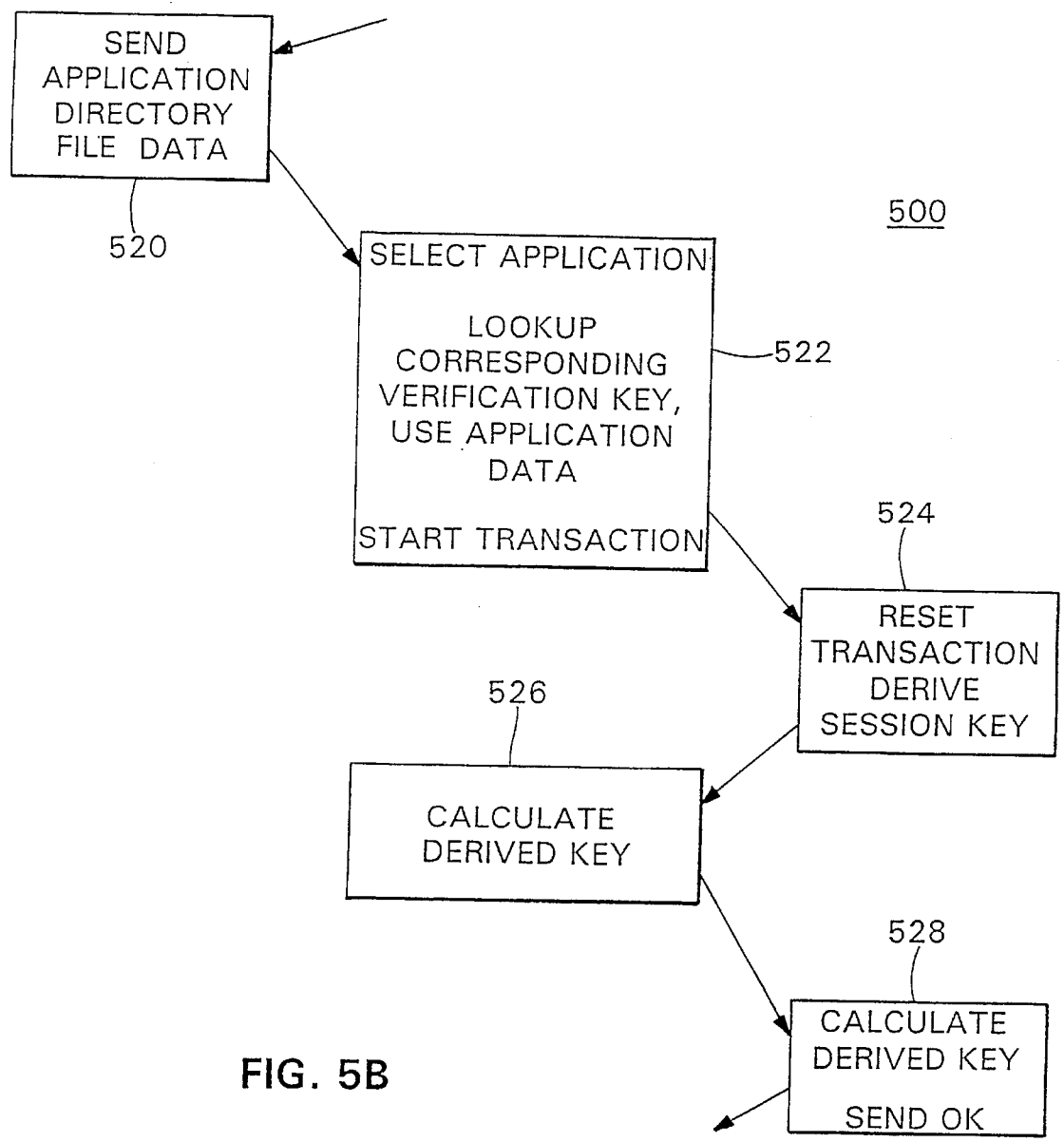
Figure 5C:
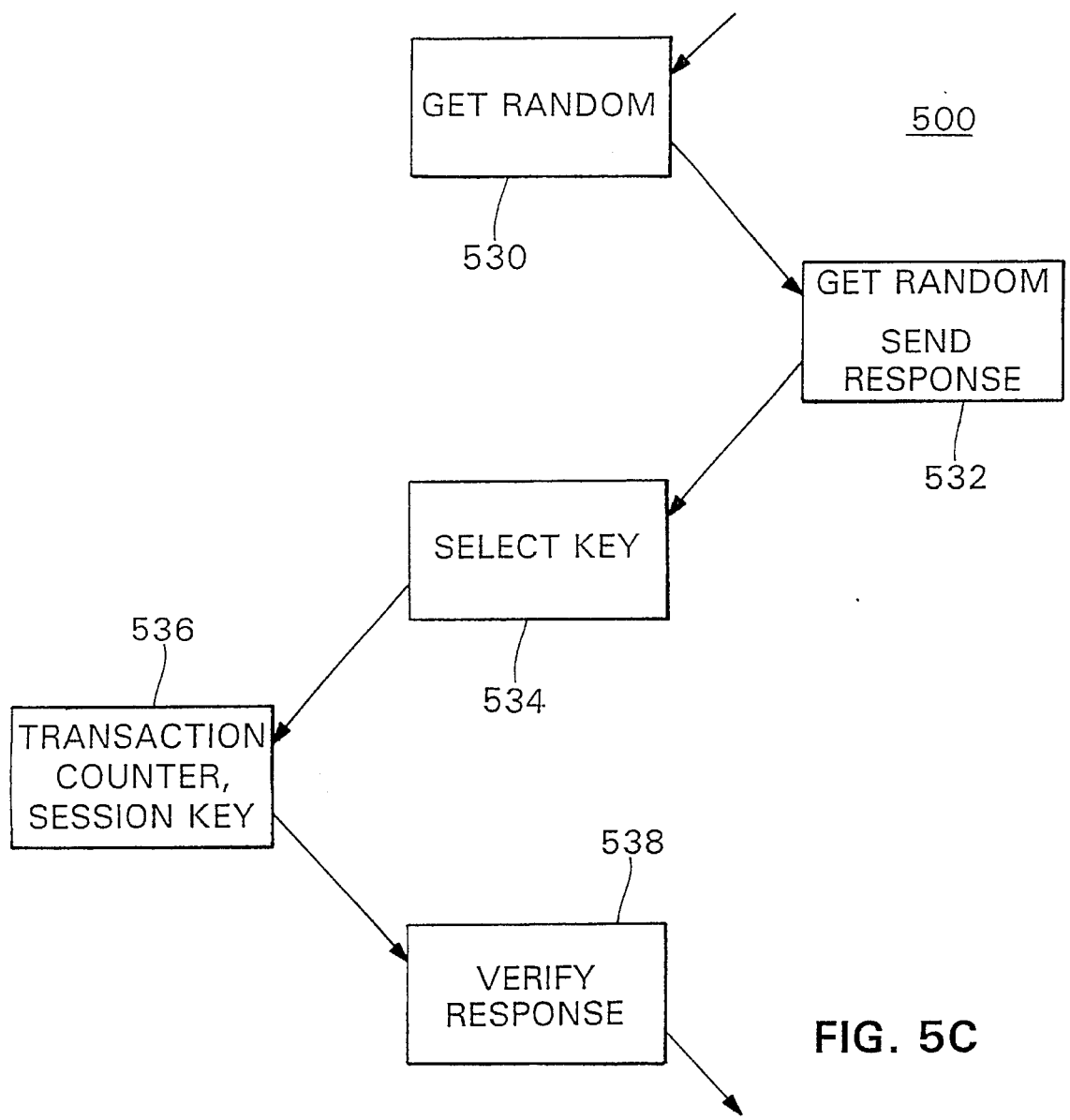
Figure 5D:
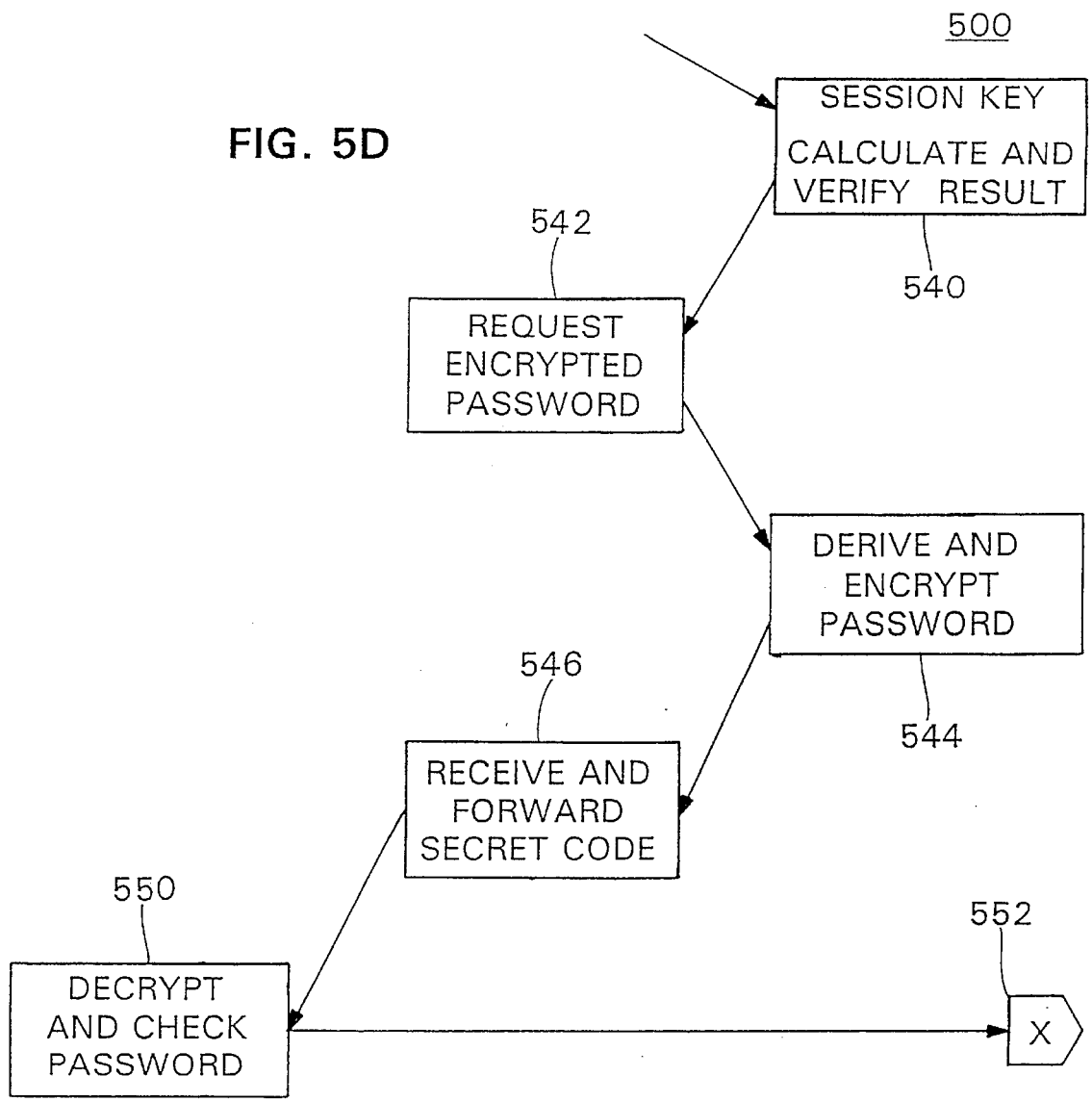

Referring to FIG. 4, there is shown the stored value transaction system 400 of the present invention. The stored value transaction system 400 includes a plurality of automatic teller machines 30, 428, a plurality point-of-sale machines and terminals 40, 50, 416 and a collection device 424 having a collection unit 420. Also included are a consolidation device 436 and a network settlement device 448. An internetwork network device 452 is provided for interfacing the transaction system 400 with a further stored value collection system such as the network 456, indicated in phantom, or with other types of networks, not shown.

Each of the devices in the stored value transaction system 400 may be referred to generally as a transaction system device. Furthermore, when the transaction system devices of the transaction system 400 transfer information to each other during a transaction they may function as (1) a value sending device, or value sender, and (2) a value receiving device, or value receiver. Furthermore, individual devices may function as both a value sending device and a value receiving device. Thus the transaction system devices of the stored value transaction system 400 may also be referred to generally as value transfer devices.

It will be understood that any work done by a value transfer device within the transaction system 400 may be referred to as a transaction. Additionally, it will be understood that the various transmission pathways for the transmission of information between the various value transfer devices of the stored value transaction system 400 may be any type of pathways. These pathways may include, but are not limited to, direct coupling, telephone switching systems, RF, microwave or optical links, and storage in magnetic, semiconductor or laser readable media for transportation between the various value transfer devices of system 400.

The public key services of the stored value transaction system 400 may generate and verify digital signatures and securely distribute secret data such as keys and secret codes in substantially the same way as described in Davis et al., Transaction System for Integrated Account Cards, U.S. patent application Ser. No. 08/255,612, filed Jun. 9, 1994. In this system both the value sending device and the value receiving device in each transaction within the transaction system has its own private key. Each of the private keys of the transaction system has its own unique public key associated with it. The public keys are shared between two transaction system devices which communicate with one another.

In the preferred embodiment of the stored value transaction system 400, a collection device 424 having a collection device security module 426 is used to collect value from a plurality of distributed value storing devices. Therefore the collection device 424 is preferably a portable device. This permits the collection device 424 to be conveniently transported in the field where numerous value storing devices may be distributed. The user of the collection device 424 is provided with a collection unit 420 which includes an integrated circuit chip as previously described with respect to the SVC 20 as well as similar security features.

When the collection unit 420 is inserted into a local value storing device within the transaction system 400, such as the point-of-sale terminal 40, the vending machine 50 or an off-line terminal 416, a secure transaction may be initiated. The purpose of the transaction is to transfer stored value transaction information and control values from the local value storing device which receives the collection unit 420 to the integrated circuit chip 24 disposed upon the collection unit 420.

For the purpose of collection from distributed value storing devices, each collection device 424 has a unique identification that is registered to the service provider. The reader/writer of such a device directs the device and security module to create a unique verifiable digital signature for each collection of data. Signatures are included with the control information in the secure memory to establish a secure transaction. In this manner when a secure transaction is established, value may be transferred from any of the local value storing devices 40, 50, 416 to the collection unit 420 in the same manner as previously described with respect to transfers of value between the devices 30, 40 and 50 and the SVC 20.

The value which is collected from the value storing devices 40, 50, 416 onto the collection unit 420 is later transferred to the collection device 424 for later transfer to a consolidation device 436. Stored value which is transferred in this manner may be totaled and then summarized or consolidated by the consolidation device 436. When performing the operation of consolidating received information representative of data transactions within the transaction system 400, the consolidation device 436 may use any consolidation techniques known in the art. Although a single collection device 424 is shown in order to simplify the drawing, stored value may be collected and consolidated by the consolidation device 436 from a number of differing collection devices 424 in the same manner wherein each of the differing collection devices 424 collects value from further value storing devices such as the value storing devices 40, 50, 416.

The consolidation device 436 is provided with its own security module 446 and its own reader/controller 438 in order to verify that the collection device 424 is valid and that the transaction with the collection device 424 is valid. When the consolidation device 436 has determined that a valid transaction has taken place between itself and a collection device 424 it clears the collection device 424 for further use.

It will be understood that the consolidation device 436 may collect data in ways other than from a collection device 424. For example, the information transferred to the consolidation device 436 by way of the collection device 424 may alternately be transferred to the consolidation device 436 by way of telephone lines. The consolidation device 436 may also be directly coupled to a number of automatic teller machines such as the automatic teller machine 30 for receiving stored value from them. Additionally, a number of automatic teller machines, such as the automatic teller machine 428, may be coupled to switches 444 for selectively transferring value from the automatic teller machines 428 to the consolidation machine 428 by way of the switches 444. The switches 444 are controlled to select automatic teller machines 428 according to an authorization certification system 432.

The consolidation device 436 is coupled to a network settlement device 448 which enters into secure transactions with the consolidation device 436 under the control of the network settlement security module 450. Thus the network settlement device 448 may receive information representative of data transfers within the stored value transaction system 400 by way of the consolidation device 436 and perform overall settlement of the accounts of the transaction system 400. Although a single consolidation device 436 is shown applying information to the network settlement device 448 in the drawing, it will be understood by those skilled in the art that any number of consolidation devices 436 may apply information to the network settlement device 448 within the stored value transaction system 400. The consolidation device 436 may perform its functions of totaling and consolidating information received in this manner at the end of each processing day. The information forwarded by the consolidation device 436 may include the total amount for each issuer of cards wherein each total amount may be accompanied by an electronic signature for security purposes. A total for each merchant or service provider may also be included in this information.

The network settlement device 448 accepts transaction data from the various transfer devices within the stored value transaction system 400 for a settlement cycle, typically a single current business day, resolves discrepancies and creates the daily accounting and payment activity. Transaction data from the consolidation device 436 may be separated into purchase and load value transactions by the network settlement device 448. Any discrepancies may be reported to the appropriate authorities, for example, operations management. The transaction detail data from distributed stored value devices may also be separated into load value and unload value transactions by the network settlement device 448.

Within the settlement device 448 purchase transactions of the stored value transaction system 400 may be verified and payment totals from the acquirer may be matched with the subtotals for the issuers. The total to be paid to each acquirer may be determined for the verified activity. The amounts for each issuer may be used for accounting and management reporting.

The load value transactions may be separated by the network settlement device 448 according to the type of value storing device within the transaction system 400. Within this category subtotals may be provided for each issuer. The totals may be used for funds pool accounting and management reporting. The payment transactions may be formatted and forwarded for payment, and settlement accounts may be debited for the payment amount. The total amount of the payment transactions may be netted against transactions to determine the net change in the funds pool. The funds pool manager may then be notified of the net change.

Thus, the processing activity of the network settlement device 448 creates the totals and subtotals of the various activities of the stored value transaction system 400. This processing may be performed upon secure consolidated data received by way of a plurality of secure transactions and summarization by the consolidation device 436. The totals and subtotals produced by the network settlement device 448 can be used to create daily settlement and audit trail reports for the acquirers and the issuers. The reports created by the network settlement device 448 may be made using the data from some or all of the stored value devices in the stored value transaction system 400.

The consolidation device 436 may apply all of the data it has received to the network settlement device 448. Alternately, in the preferred embodiment of the invention, the consolidation device 436 may apply any consolidated portion or summary of the data in accordance with program instructions well understood by those skilled in the art. The consolidated portions of the data not transmitted to the network settlement device 448, or any other portions of the information received by the consolidation device 436, may be stored in the archives 440 by the consolidation device 436.

Thus, the settlement device 448 can perform settlement of the stored value transaction system 400 on a consolidated portion of the stored value transaction system 400 while the remainder of the information is saved in the archives 440 for research or other purposes. The network settlement device 448 may also maintain central archives 460 shown in phantom.

Additionally, it will be understood that the consolidation device 436 may store all of its received data in the archives 440 rather than only a portion. In embodiments of the stored value transaction system 400 including a plurality of the consolidation devices 436, each of the separate consolidation devices 436 may forward differing amounts or portions of their received data information to the network settlement device 448 and store differing amounts in its individual archives 440 or in a single archives 440.

Additionally, in the preferred embodiment of the stored value transaction system 400, the network settlement device 448 may perform further consolidation using any consolidation techniques known in the art. It may forward all or any portion of information received from a plurality of consolidation devices 436, or all or any portion of information received from a single consolidation device 436, to the internetwork device 452. Similarly, whether a number of consolidation devices 436 or a single consolidation device 436 is provided within the transaction system 400, all or any portion of the data received from them by the network settlement device 448 may be applied to the internetwork device 452. The information received by the internetwork device 452 with any type of consolidation may then be transmitted to other transaction networks such as the network 456 or to other types of networks. In general, it is believed that it is best to perform the consolidation operations of the stored value transaction system 400 as early in the collection stream as possible. However, it should not be performed at locations where security cannot be provided for the stored data resulting from the operations.

Referring to FIGS. 5A–D, there is shown the value transfer protocol 500. The value transfer protocol 500 is a basic flow diagram of the preferred procedure or method in the present invention for collecting value within the stored value transaction system 400. For the purpose of illustration the collection of stored value from the POS terminal 40 using the collection unit 420 is illustrated. However it will be understood that the same or a similar or a related method may be used for collecting stored value from the ATM 30, the vending machine 50 or from any other distributed value storing device within the transaction system 400. Additionally, the method set forth in the value transfer protocol 500 or a similar method may be used when the collection device 424 collects value directly from a stored value device rather than by way of a collection unit 420.

In FIGS. 5A–D, activities which take place within the collection unit 420 are illustrated in the left column, activities which take place within the reader/writer processor 74 of the POS terminal 40 are illustrated in the center column, and activities which take place in the security module 78 of the POS terminal 40 are illustrated in the right column. The security module 78, as well as the other security modules within the stored value transaction system 400, are secure components which are not easily accessible to would-be thieves.

A collected value transaction using the collection unit 420 begins with the insertion of the collection unit 420 into the card slot 48 of the POS terminal 40. This causes the establishment of an electrical connection between the acceptor/holder 72 of the POS terminal 40 and the inserted collection unit 420. Once the electrical connection has been established and the collection unit 420 is accepted by the reader/writer processor 74 of the POS terminal 40 a reset is sent to the collection unit 420 as shown in block 502. The collection unit 420 receives the reset from the processor 74 and answers the reset as shown in block 504 in order to perform a handshake with the POS terminal 40.

The reader/writer processor 74 then determines the status of the collection unit 420 as shown in block 508. The collection unit 420 transmits its control unit serial number to the reader/writer processor 74 as shown in block 512. In block 516 the reader/writer processor 74 determines the card type and initiates a read of the application directory file which resides in the collection unit 420.

In response, the collection unit 420 sends the application directory file data to the reader/writer processor 74 as shown in block 520. The reader/writer processor 74 then selects the application as shown in block 522. The reader/writer processor 74 also looks up the verification key, the number of device uses and the application data. The transaction is then started by the reader/writer processor 74 in block 522.

Each time a transaction occurs the transaction counter of the security module 78 is reset as shown in block 524. A derived key is then calculated for the reader/writer processor 74 and the security module 78 as shown in blocks 524, 526. The reader/writer processor 74 then obtains a random number and transmits the random number to the security module 78 as shown in blocks 530, 532. When the security module 78 responds to the random number, the reader/writer processor 74 selects a key as shown in block 534. As shown in block 536, the collection unit 420 updates its transaction counter and determines its session key. When the reader/writer processor 74 verifies this, as shown in block 538, the security module 78 determines its session key. The security module 78 compares the two session keys to make a secure transaction determination. If the two session keys are the same the security module 78 verifies the result as also shown in block 540. At this point a secure transaction is determined.

In block 542 of the protocol 500 the reader/writer processor 74 requests a ciphered password from the security module 78. The security module 78 derives and encrypts a password and transmits it to the reader/writer processor 74 as shown in block 544. The encrypted word is received by the reader/writer processor 74 as shown in block 546 and forwarded to the collection unit 420 as shown in block 550. The collection unit 420 decrypts and checks the password. Execution of the value transfer protocol 500 then proceeds by way of off-page connector 552.

It will be understood that the generate collection dialog protocol 600, the verify collection dialog protocol 700 and the unload controls dialog protocol 800 of the system of the present invention as described hereinbelow all proceed from the value transfer protocol 500 by way of the off-page connector 552. Thus protocols 600, 700, 800 all proceed from the same or similar procedures in order to make secure transaction determinations prior to the transfer of value information.

Figure 6:
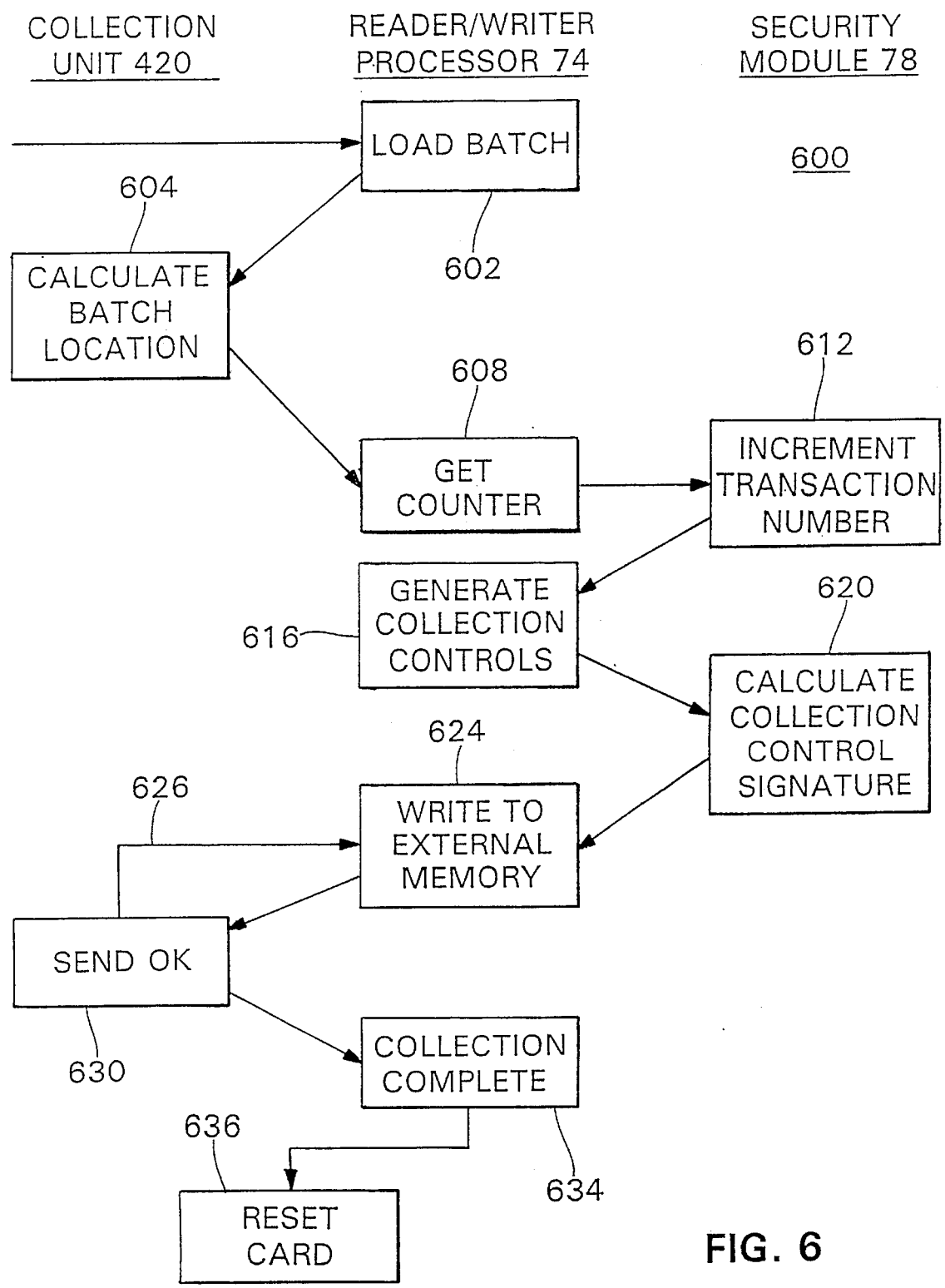
FIG. 6 is a continuation of a flow diagram of the preferred value transfer protocol for generating collection dialog of FIGS. 5A–5D.

Referring to FIG. 6, there is shown the generate collection dialog protocol 600. Execution of the generate collection dialog protocol 600 proceeds from execution of the value transfer protocol 500 by way of the off-page connector 552 of the protocol 500 and the on-page connector 601 of the protocol 600. It will be understood that the POS terminal 40 may store a batch of transactions. Thus, a batch load is performed within the generate collection dialog 600 as shown in block 602 in order to determine the information representative of all the transactions stored by the POS terminal 40. The collection unit 420 then calculates the batch location as shown in block 604 in order to make sure it has enough room for all the information. The processor 74 gets its counter and the security module 78 increments the transaction number as shown in blocks 608, 612. The collection controls are generated in block 616 and the collection control signature is calculated by the security module 78 as shown in block 620.

The processor 74 then issues a "write to external memory" command as shown at block 624 in the collection device 420 which executes and acknowledges completion as shown in block 630. This is acknowledged by the collection unit 420 as shown in block 630. Execution of the generate collection dialog protocol 600 may loop between blocks 624, 630 by way of pathway 626 a number of times to complete the write of block 624. As shown in block 634 collection is then complete and the SVC 20 is reset in block 636.

Figure 7:
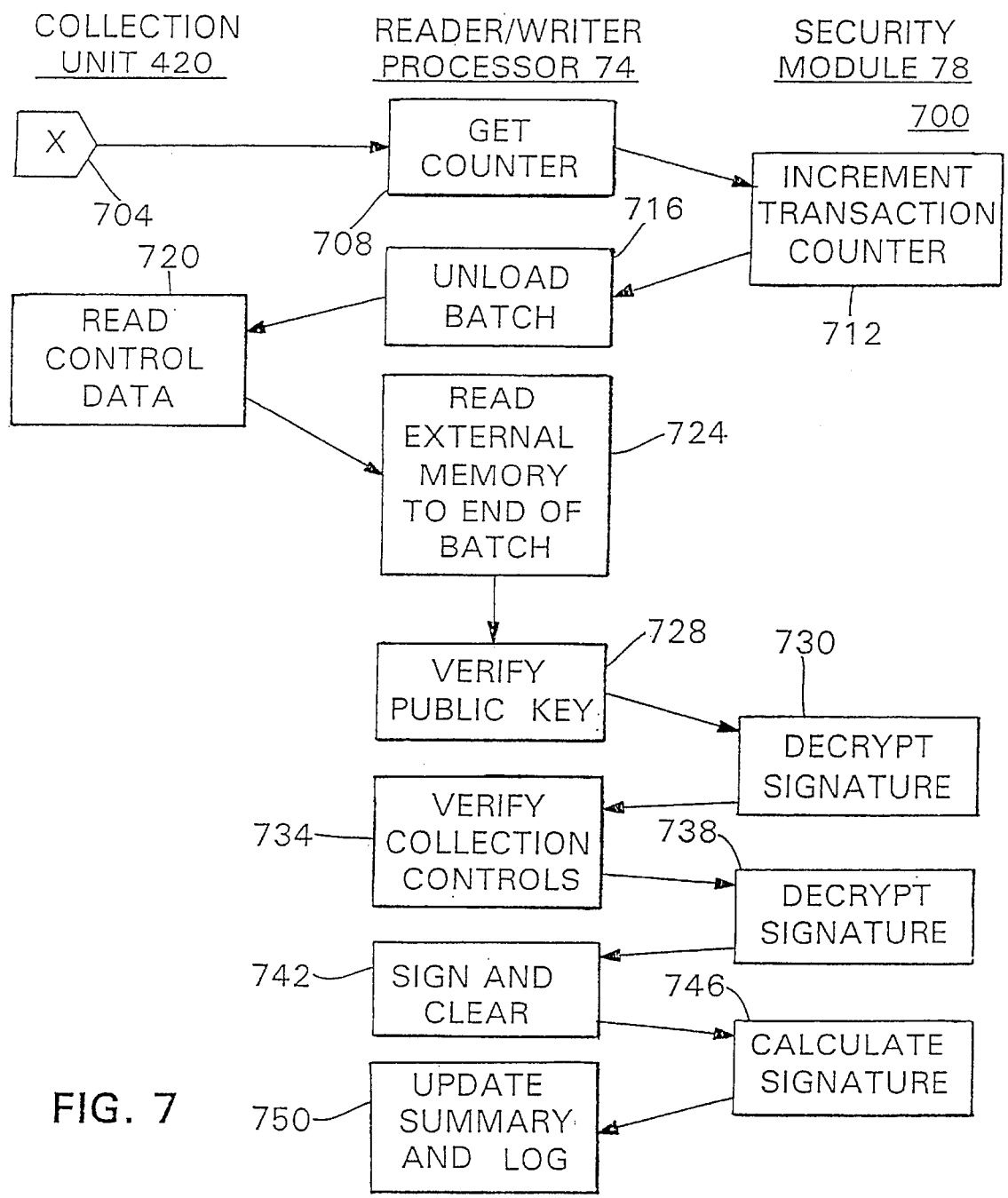
FIG. 7 is a continuation of the flow diagram of the preferred value transfer protocol for verifying the collection dialog of FIGS. 5A–5D.

Referring to FIG. 7, there is shown the verify collection dialog protocol 700. Execution of the verify collection dialog protocol 700 proceeds from the value transfer protocol 500 by way of the off-page connector 552 of the protocol 500 and the on-page connector 704 of the protocol 700. The reader/writer processor 74 obtains its counter as shown in block 708 and the security module 78 increments its transaction counter as shown in block 712. The batch is unloaded as shown in block 716 and the control data is read, as shown in block 720. The reader/writer processor 74 then reads the external memory up to the end of the batch as shown in block 724.

The public key, if used, is then verified as shown in block 728. In block 730 the security module 78 uses the network authority key to decrypt the signature and verify the device public key.

In block 734 the processor 74 verifies the collection controls and in block 738 the security module 78 uses the device key to decrypt the signature and verify the controls. The transaction is then signed and cleared by the reader/writer processor 74 in block 742. The signature is calculated and the summary and log are updated as shown in block 746, 750.

Figure 8A:
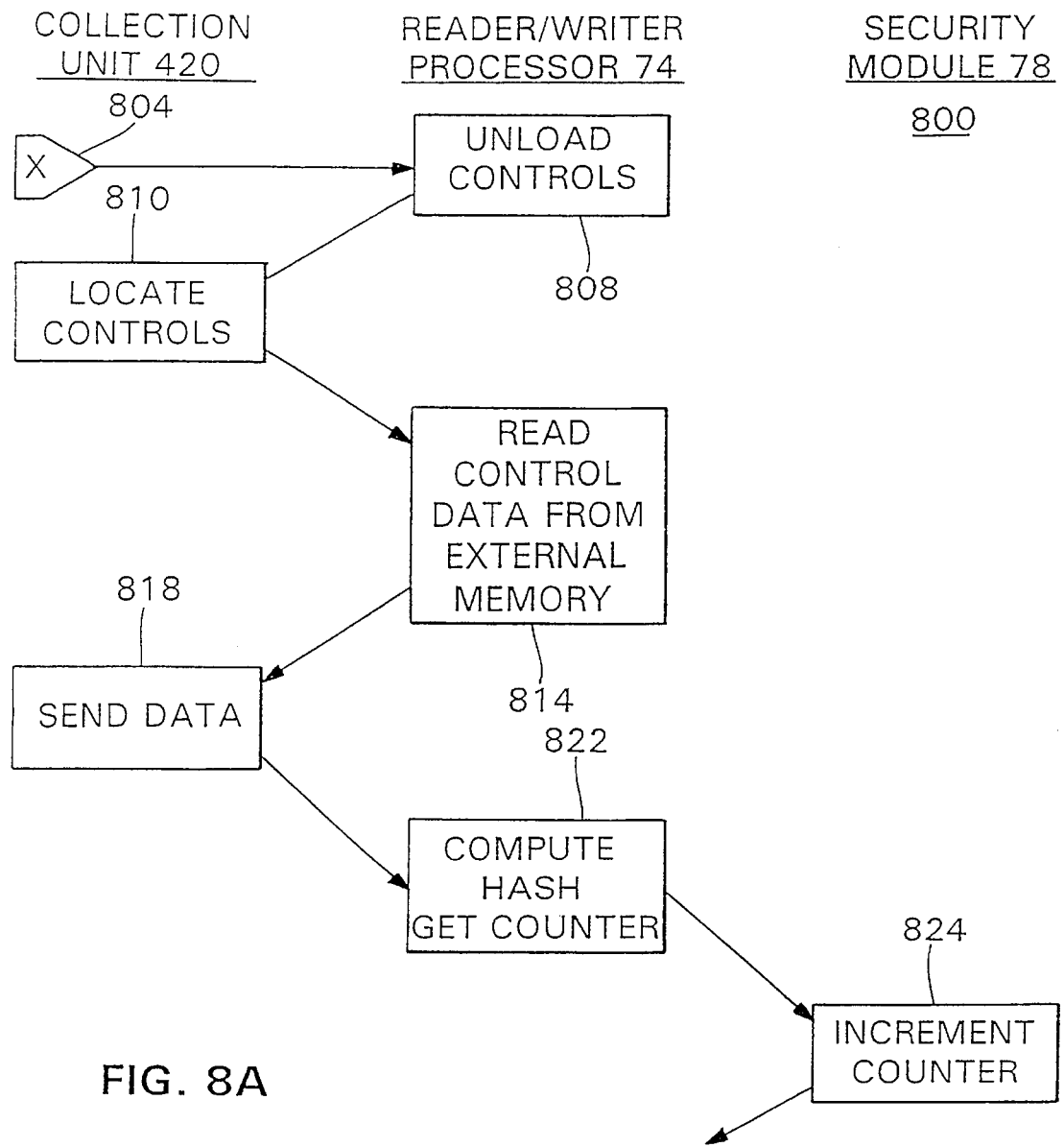
FIGS. 8A and 8B are a continuation of the flow diagram of the preferred value transfer protocol for unloading the controls dialog of FIGS. 5A–5D.
Figure 8B:
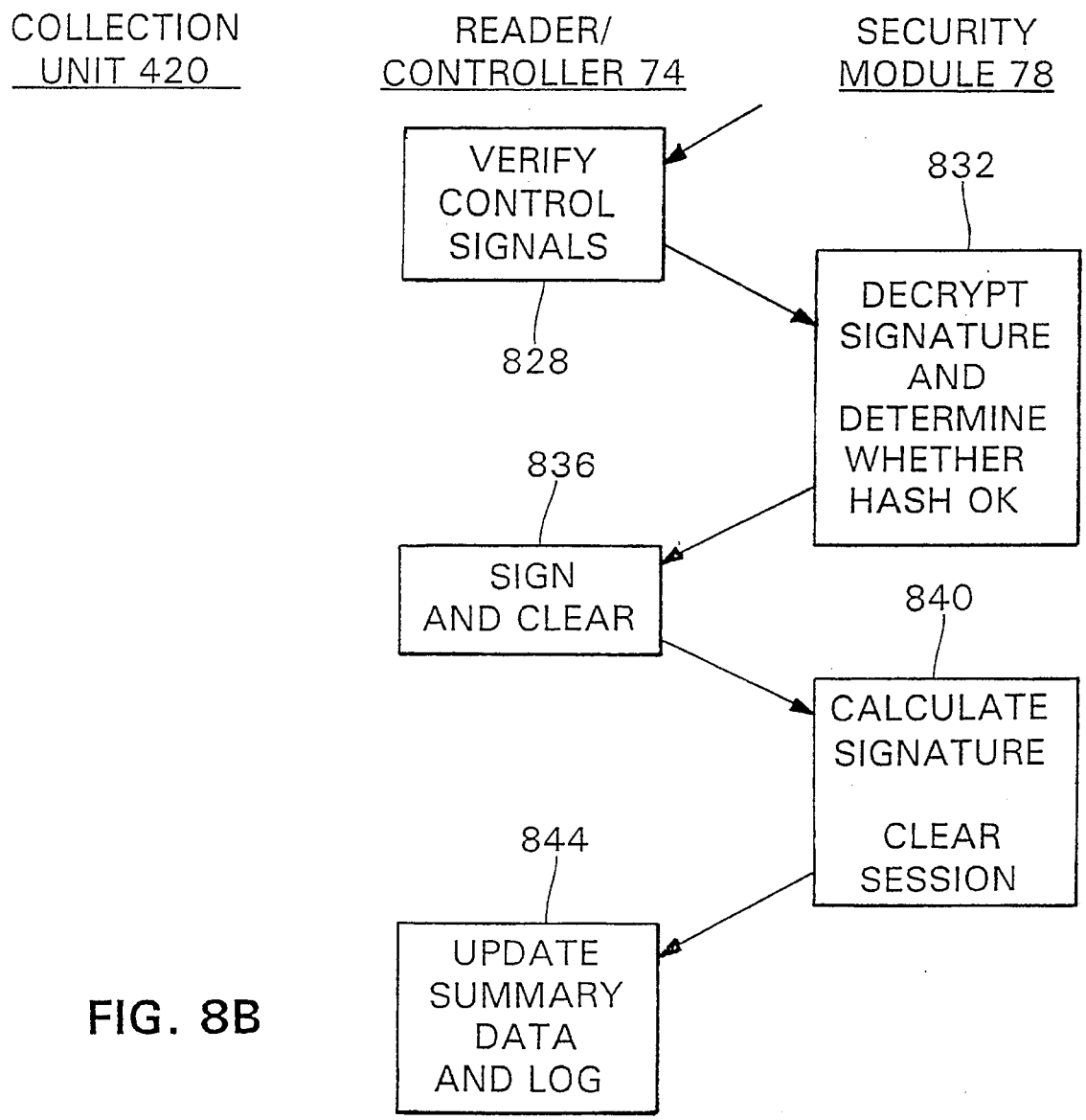

Referring to FIGS. 8A and 8B, there is shown the unload controls dialog protocol 800. The unload controls dialog 800 is executed by way of the value transfer protocol 500 as previously described. Processing from the protocol 500 is by way of the off-page connector 552 and the on-page connector 804 of the protocol 800. The reader/writer processor 74 of the POS terminal 40 unloads the controls in block 808. In block 810 the collection unit 420 locates the controls. The control data for either a batch or a transaction is read from external memory in block 814. In block 818 the collection unit 420 sends the data to the processor 74. In block 822 a hash is computed and the counter is read by the processor 74. The counter is incremented by the security module 78 in block 824.

The control signals are verified in block 828 and the signature is decrypted in block 832. Additionally, the security module 78 determines whether the hash of block 822 is correct. If these are correct the processor 74 signs and clears the transaction in block 836 and the security module 78 calculates a signature and clears the session in block 840. The summary data and log are updated in block 844 by the processor 74.

Figure 9A:
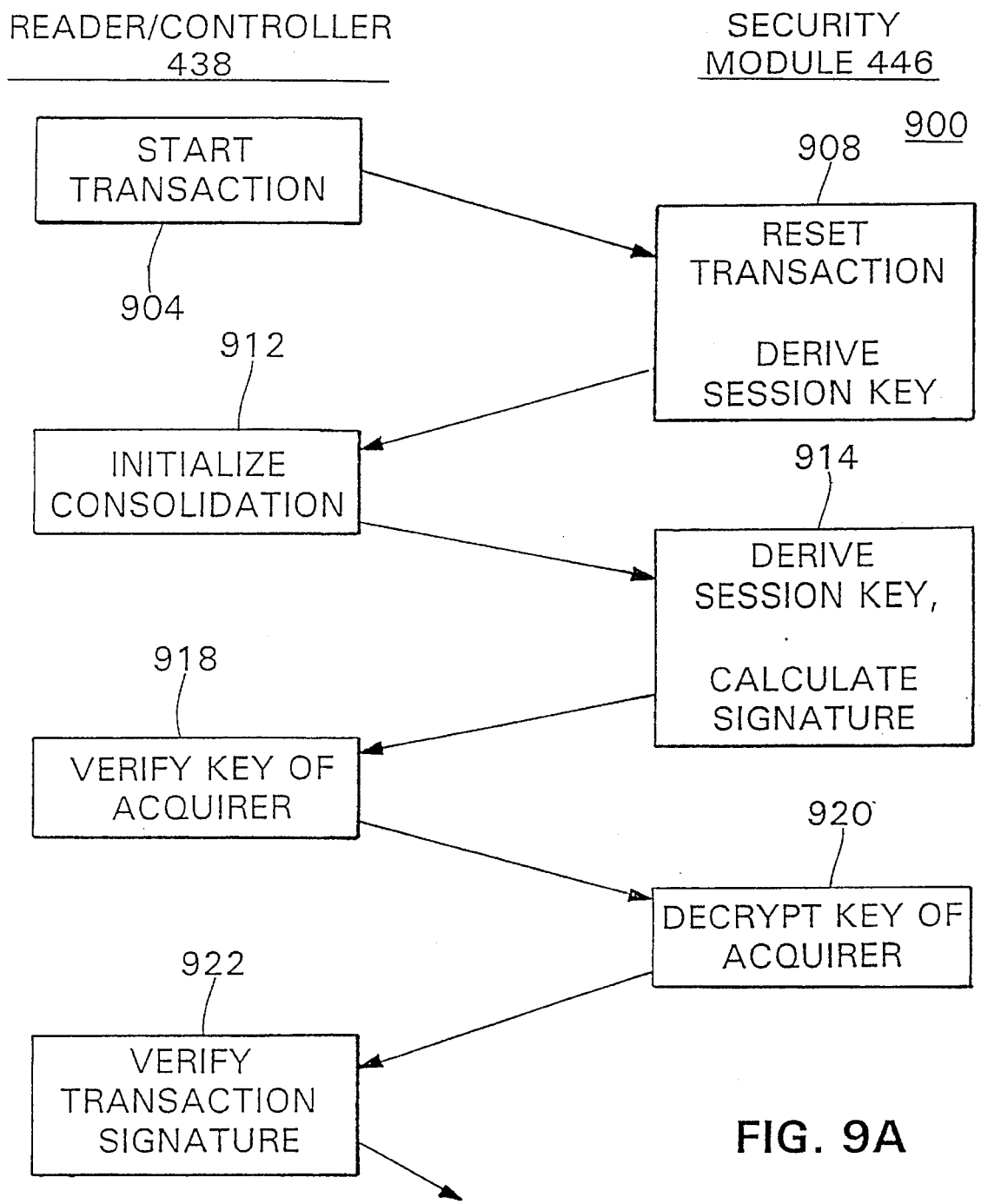
FIGS. 9A and 9B are a flow diagram of a preferred embodiment of the consolidation dialog of the present invention.
Figure 9B:
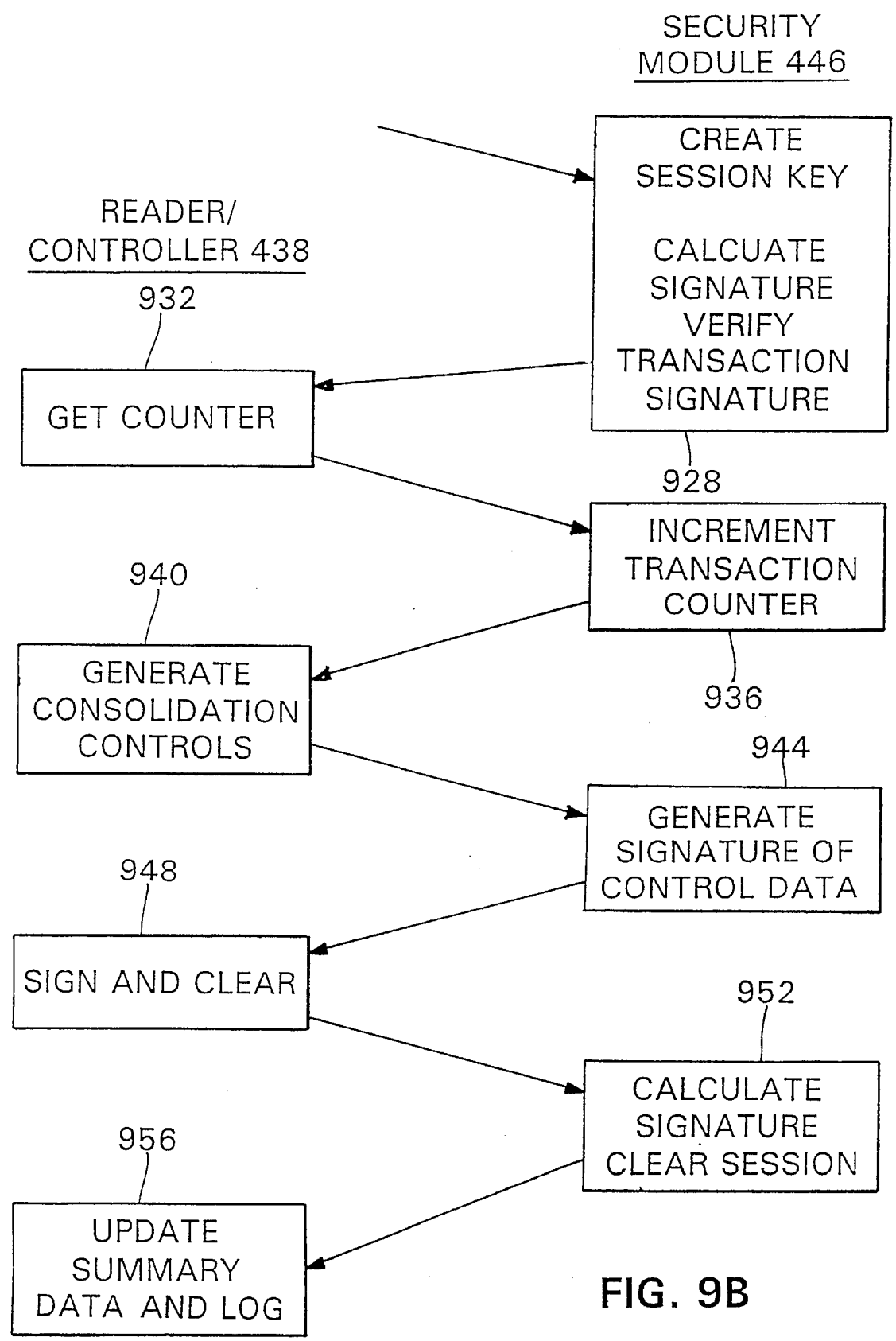

Referring to FIGS. 9A and 9B, there is shown the consolidation dialog protocol 900 for performing consolidation of information received from the collection device 424 by the consolidation device 436 of the stored value transaction system 400. The transaction controlled according to the consolidation dialog protocol 900 is begun by a reader/controller 438 within the consolidation device 436 as shown in block 904. In block 908 the security module 446 within the consolidation device 436 resets the transaction and derives a session key. The consolidation process is then initialized in block 918 by the reader/controller 438. In block 914 a security module session key is derived and a signature is calculated. The key of the acquirer is verified by the controller 438 in block 918 and decrypted in block 920 by the security module 446. It will be understood that the acquirer is an institution which has automatic teller machines and other transaction devices and receives transactions for cards issued to other institutions through reader/writer units. The transaction signature is verified by the controller 438 in block 922.

The security module 446 then creates its session key, calculates a signature and verifies the transaction signature in block 928. The counter is obtained in block 932 and incremented in block 936. The processor 438 issues the command to generate consolidation controls in block 940 to the security module 446 which executes and acknowledges completion as shown in block 944. In block 944 the signature is decrypted by the consolidation security module 446. If the cross-verification process of the present invention is successful, the reader/controller 438 issues the command to "sign and clear" in block 948 to the security module 446 which executes and acknowledges completion as shown in block 952. In block 956 the summary data and log are updated.

Referring to FIG. 10, there is shown a stored value application key table 1000. The stored value application key table 1000 is a tabulation of various digital encryption standard keys used within the stored value transaction system 400. For example, the key table 1000 includes the digital encryption standard keys used in the protocols 500, 600, 700, 800 and 900. The key table 1000 includes the verification keys, the authorization keys, the issuer signature keys, the acquirer signatures, the public keys and the network authority secret key signatures for various stored value devices within the stored value transaction system 400. The stored value devices within the stored value transaction system 400 whose keys are listed in the table 1000 include the stored value card 20, the security module 78 of the POS terminal 40, the collection unit 420, the control unit 420, which is a control unit for transferring software updates to distributed stored value devices, the collection system 424 and the consolidation system 436. Note that the collection unit 420 and the control unit 420 may be the same device.

Figure 11:
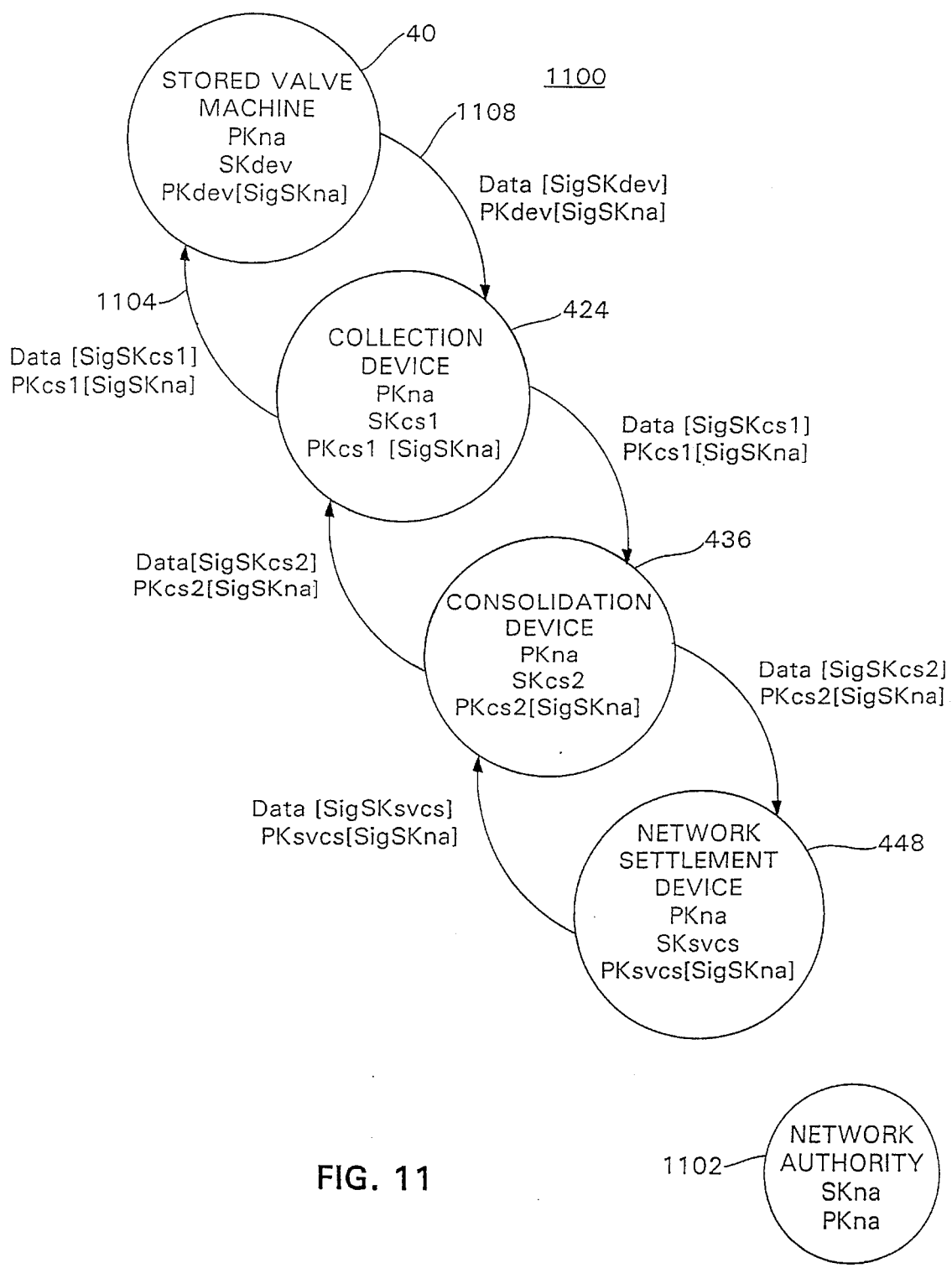
FIG. 11 is a process overview of the collection and control public key in accordance with the present invention.
Figure 12:
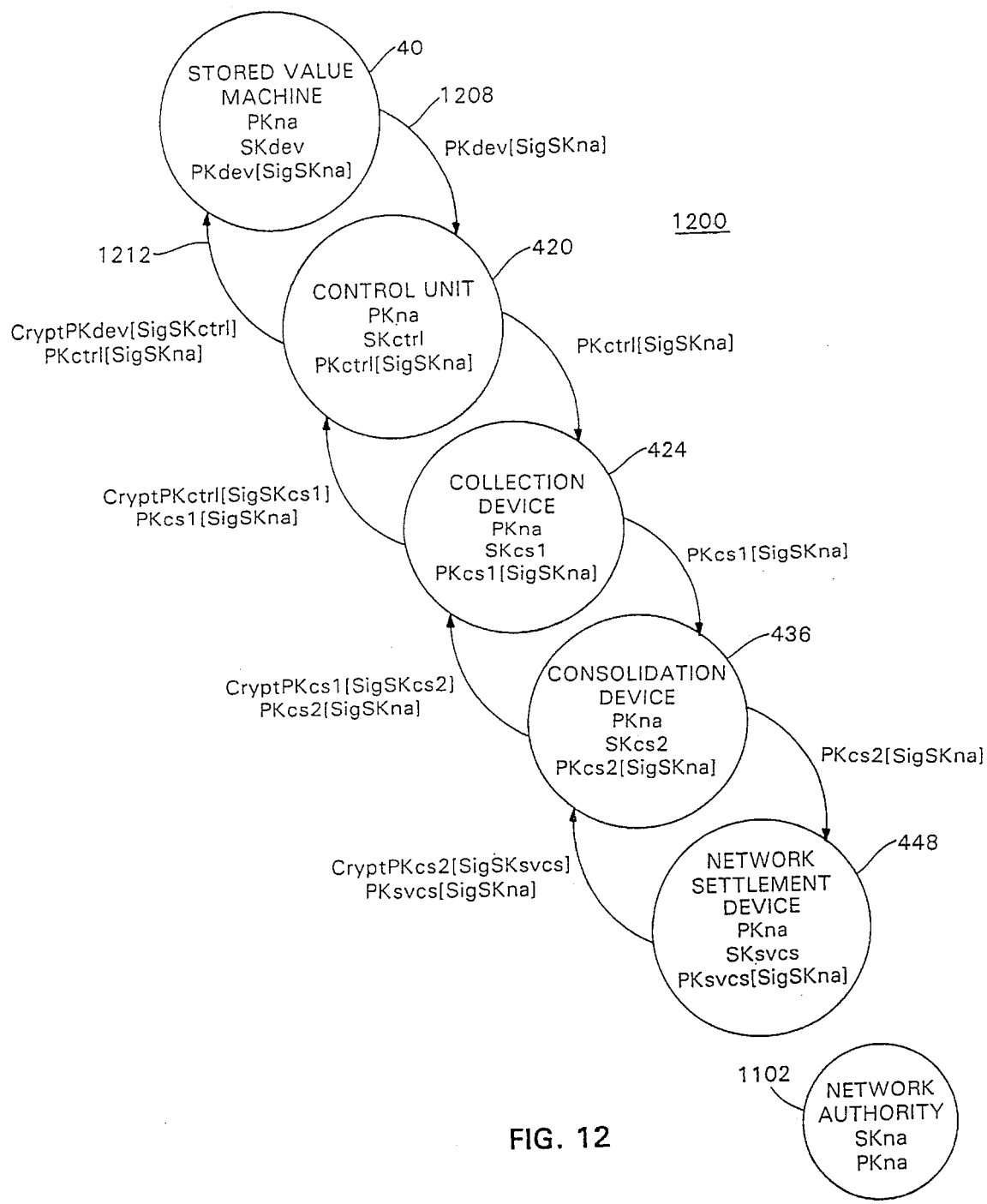
FIG. 12 is a process overview of the control public key system for secret data in accordance with the present invention.

Referring to FIGS. 11, 12, there are shown the collection and control public key overview 1100 and the control public key for secret data overview 1200. The overviews 1100, 1200 illustrate the cryptographic keys which reside in the various stored value devices within the stored value transaction system 400 as well as the transmission of keys and secret data between the various stored value devices. For example, each distributed stored value device within the stored value transaction system 400, such as the POS terminal 40, the collection device 424, the network settlement device 448 and the network authority 1102, includes the network authority public key. The network authority 1102 is an institution or operation independent of any other operations in the network 400 which manages the security of the network 400 and which performs certain key management operations. The network authority public key, which is thus a common key within the stored value transaction system 400, may be designated PKna.

Further examples of the use of cryptographic keys within the stored value transaction system 400 may be found by further reference to the blocks and arrows within the overviews 1100, 1200. For example, overview 1100, 1200 show that each of the value transferring devices 424, 436, 448 has its own private key. The stored value collection device 424 has its collection system private key SKcs1, the consolidation device 436 has its processing system private key SKcs2, and the network settlement device 448 has its central system private key SKsvcs. The stored value control unit 420 has its collection system private key Skctrl and the POS terminal 40 also has its own private key SKdev.

Each value storing and transferring device 40, 424, 436 and 448 also has its terminal public key. The terminal public key of the POS terminal 40 is designated PKdev[SigSkna] which indicates that the public key PKdev of the POS terminal 40 is signed by the network authority private key SKna. This signed key is transmitted from the POS terminal 40 by the stored value collection unit 420 by way of the transfer arrows 1108, 1208.

Additionally, each of the transaction system devices of the stored value transaction system 400 contains a public key signature from the network authority 1102. The public key signatures may serve as proof of membership in the transaction system 400. Furthermore, the network settlement device 448, the internetwork device 452 and the network 456 may have a common key in order to permit secure value determinations prior to transfer of value information between them. As previously described, when two transaction system devices within the stored value transaction system 400 communicate with each other, they first exchange or have previously exchanged these public keys along with a signature of their public key using the private key SKna of the network authority 1102. Each transaction system device then verifies the other device and its public key by decrypting the signature with the network authority public key. Therefore, the only keys a transaction system device must communicate within the stored value transaction system 400 are the system public key pair and the network authority public key.

For example, the POS terminal 40 has a public key, signed by the authority 1102, as indicated by the symbol PKdev [SigSKna], the collection device 424 has the public key as indicated by the symbol PKcs1[SigSKna], and the consolidation device 436 has the key PKcs2[SigSKna]. The public keys may be used for authentication within the transaction system 400 in the following manner. When a transaction system device within the stored value transaction system 400 must confirm the integrity of data received from another transaction system device it uses its private key to compute an authentication signature. Used in this way the public key prevents modification of the data using the same signature. In the case where large amounts of data are signed by the various transaction system devices in the stored value transaction system 400, a hash function is used. This reduces long messages into shorter digests which are more suitable for signature computation.

After the signature is computed by a transaction system device within the stored value transaction system 400 it is transmitted along with the data to be transferred. In order to authenticate the transferred data a transaction system device receiving it decrypts the digital signature using the public key. The receiving transaction system device then compares this result with the computer hash. If the hash is the same the data is authenticated by the receiving system. In this case the signature can only be used to authenticate the data. It cannot be used to recover the data.

As shown in the control public key for secret data overview 1200 the public key is used for secret data distribution within the stored value transaction system 400. In order to send the secret data the sending collection system device encrypts the data using the public key of the receiving transaction system device. The receiving transaction system device then decrypts the data using its own private key.

For example, referring to arrow 1212 of the overview the 1200, the control unit 420 sends data to the POS terminal 40. This data is encrypted using the device public key PKdev of the POS terminal 40. This is indicated by the prefix Crypt-PKdev. The verification that the transmission is from the control unit 420 is the signature [SigSKctrl].

Thus when encrypted secret data is sent to a receiving device within the stored value transaction system 400 in accordance with the overview 1200 the sending device generates a digital signature that can be used to verify the identify of the sender. In general the sending transaction system device may generate the digital signature by signing the encrypted data or hash thereof using its private key and appending the resulting signature to the encrypted data before sending it. The receiving transaction system device then decrypts the digital signature using the public key that corresponds to the private key of the sending transaction system device.

Within the secret data overview 1200 a determination is then made whether the result is the same as the encrypted data or the hash thereof that was received with the digital signature. If it is the same the receiving transaction system device determines that both the signature and the encrypted data came from the sending device. This is determined because only the sending device has the private key that was used to sign the encrypted data. Consequently, the sending device cannot repudiate the sending of the encrypted data.

In the method of the present invention every transaction between the various transaction system devices includes an independent cross-verification of this type wherein the sending device and the receiving device perform their own verification. While a cross-verification is performed for all transactions in the preferred embodiment of the stored value transaction system 400 it will be understood that the various value transfer devices within the transaction system 400 may be programmed to pass selected data through without verification.

It is not necessary to use DES alone or public key techniques alone in the security method of the stored value transaction system 400. Additional techniques may be applied in order to increase resistance to attack. The additional techniques may include diversification of DES keys, session diversification, multiple derived keys, partial signatures and any other known security techniques.

Diversification of DES keys is a method in which a large number of DES keys are derived from one master key. In the preferred embodiment the derived keys are created by encrypting a unique sixty-four bit number with the master key to produce a unique key. One advantage of this diversification is that if any one derived key is compromised all the other derived keys and the master key are still secure. Another advantage is that fewer keys must be managed in the transaction system 400 thereby reducing system overhead.

In the preferred embodiment of the transaction system 400 triple DES keys are derived using a set of three master keys. The derived keys are created by encrypting the unique sixty-four bit number with a first of the three master keys and encrypting the result with a second master key. The result of the second encryption is then encrypted with the third key. Further encryptions may also be performed in this manner. An advantage of this multiple encryption method is that it is more difficult for an attacker to discover the master key when one or more of the derived keys are discovered. Triple encryption is equivalent to doubling the key size of DES.

The derived keys of the stored value transaction system 400 are not used directly to encrypt any data that would be available at an outside interface to the transaction system 400. They are diversified further by encrypting a transaction counter with the derived keys to form session keys which are unique to the current session.

Figure 13A:
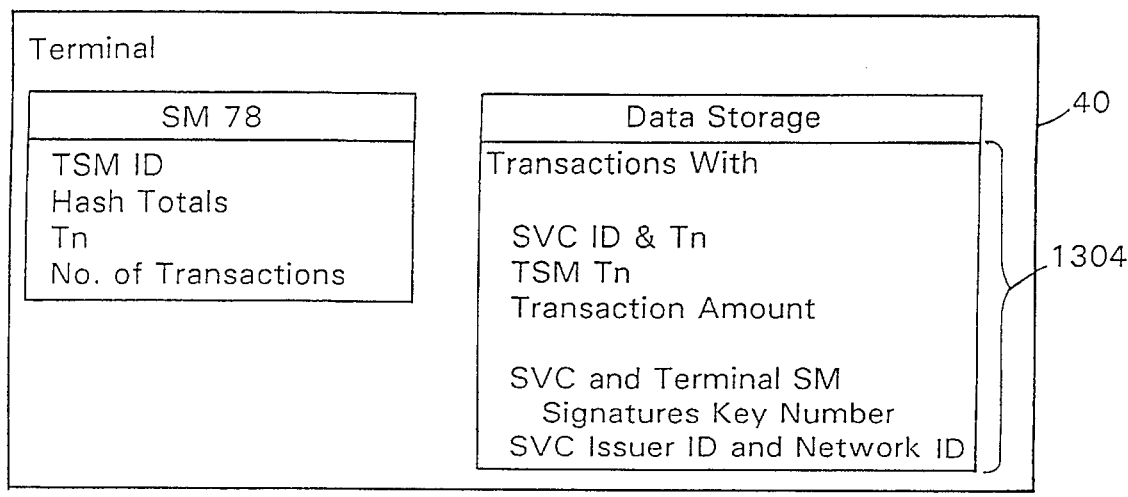

Referring to FIGS. 13A–13D, there are shown representations of the data and the data structures containing the stored value information collected within various stored value transfer devices of the stored value transaction system 400. With reference to FIG. 13A in particular it will be seen that the security module 78 of the POS terminal 40 stores the terminal security model identification TSM ID, the hash totals, the transaction counter $T_n$ and the number of transactions in which the POS terminal 40 engaged.

Also present within the POS terminal 40 is a data structure 1304 containing information representing a transaction between the POS terminal 40 and SVC 20. The data structure 1304 includes the identification SVC ID of the stored value card 20 along with its transaction number and the transaction number TSM $T_n$ of the POS security module 78 as well as the transaction amount for each transaction of the POS terminal 40. Various other data items related to the transaction may be stored in the data structure 1304, including information such as the signatures of the SVC 20 and the security module 78. The key number and the identification of the issuer of the SVC 20, and its network identification may also be included within the data structure 1304.

Figure 13B:
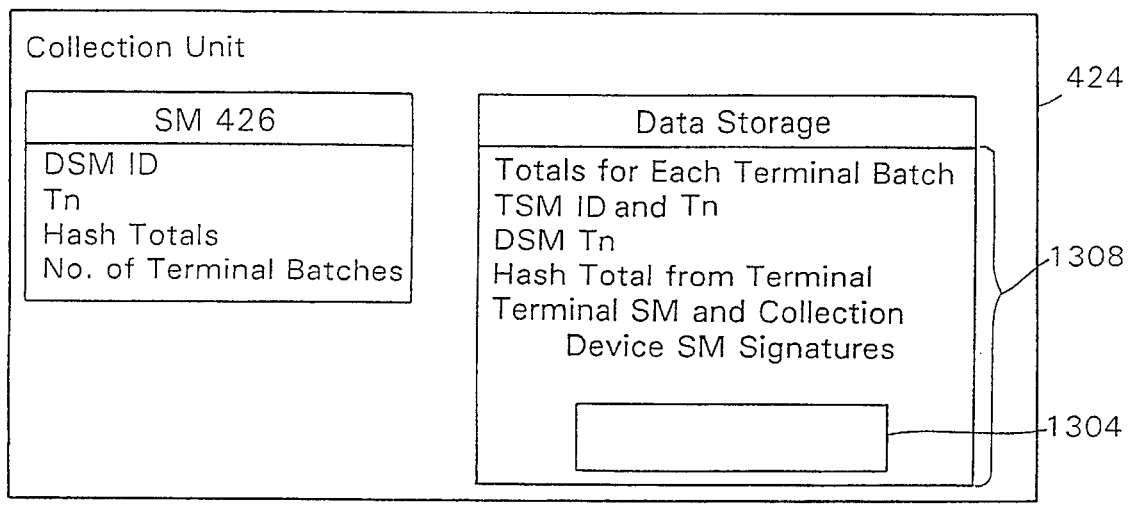

As previously described, information from the POS terminal 40 is transmitted to the collection device 424. This results in the formation of a new data structure within the collection device 424 as shown in FIG. 13B. The collection device 424 has its own security module 426 which contains its security module device identification DSM ID, its transaction number $T_n$ and hash totals as well as the number of terminal batches. The number of terminal batches is required because the collection device 424 may collect a number of different batches of information from a number of different stored value devices 40, 50, 416 or from the same stored value device 50, 50 416.

When the collection device 424 receives the data structure 1304 from the POS terminal 40 it appends the data set forth therein to its own data in order to form the data structure 1308. The data within the collection device 424 to which the data structure 1304 is appended may include, but is not limited to, the totals for each terminal batch, the terminal security module identification TSM ID and transaction number as well as the transaction number of the collection device 424 itself, DSM ID.

Figure 13C:
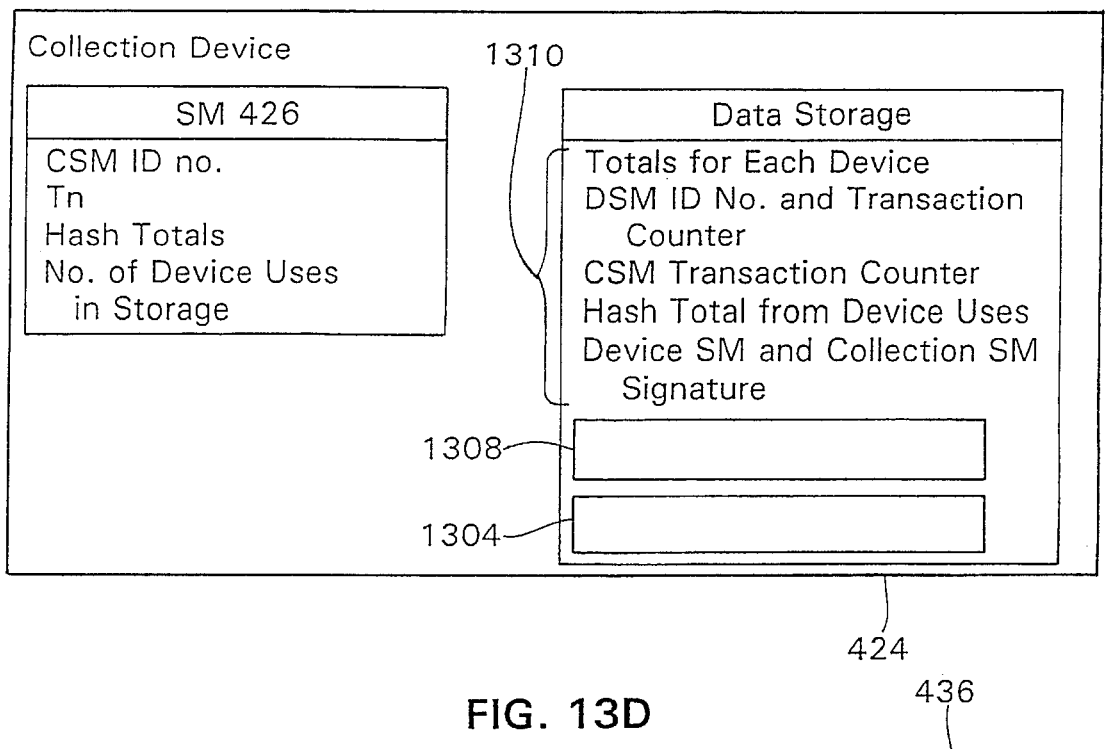
Figure 13D:
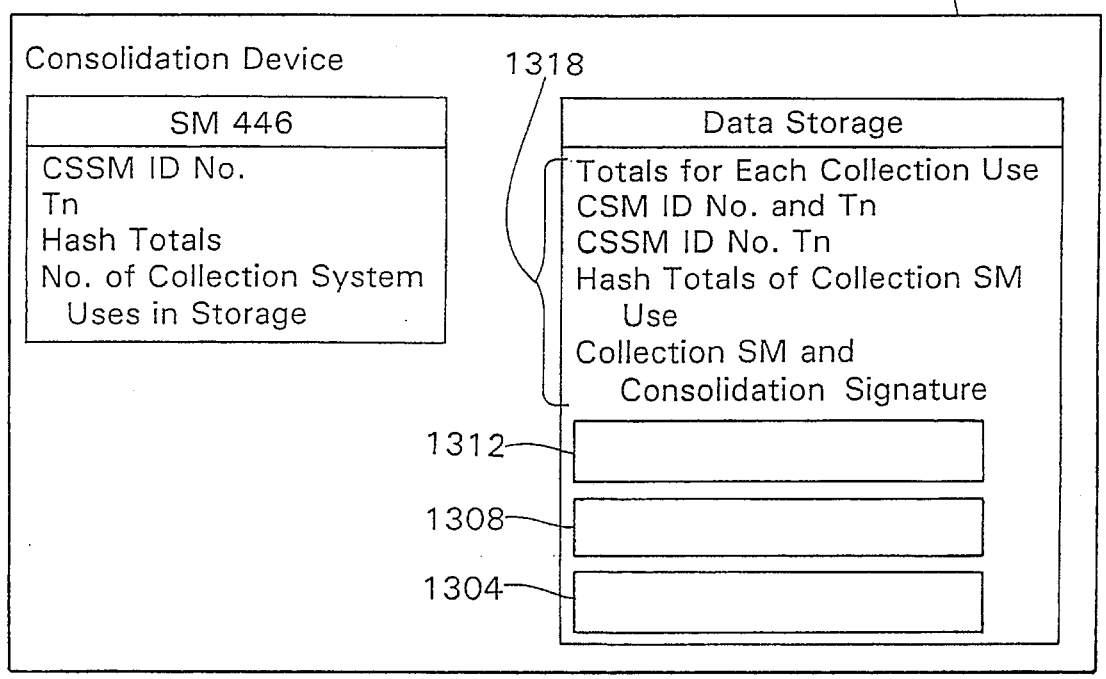
Figure 13G:
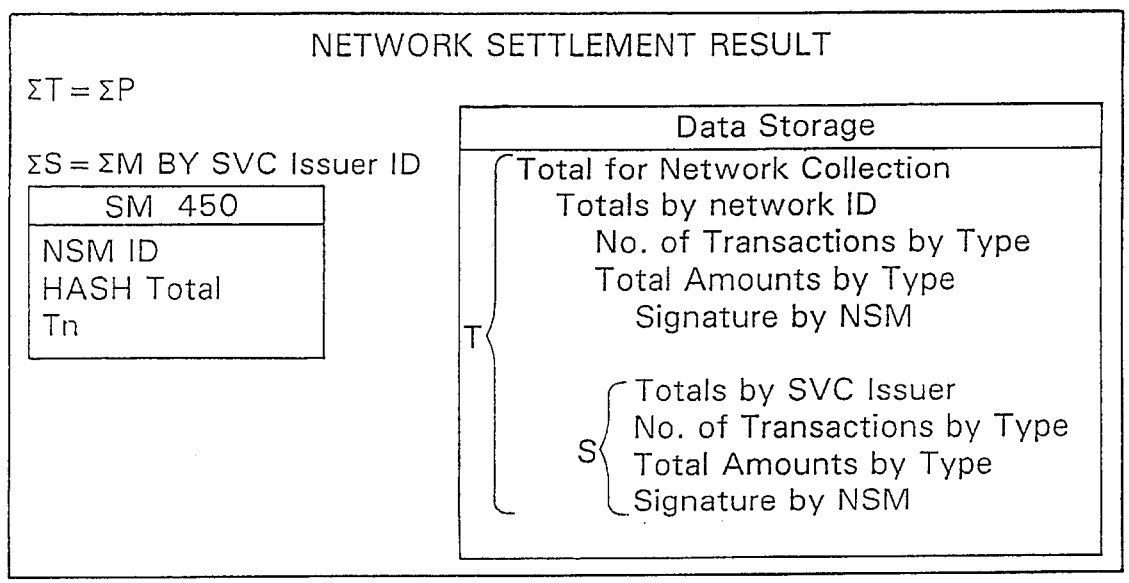
Figure 13H:
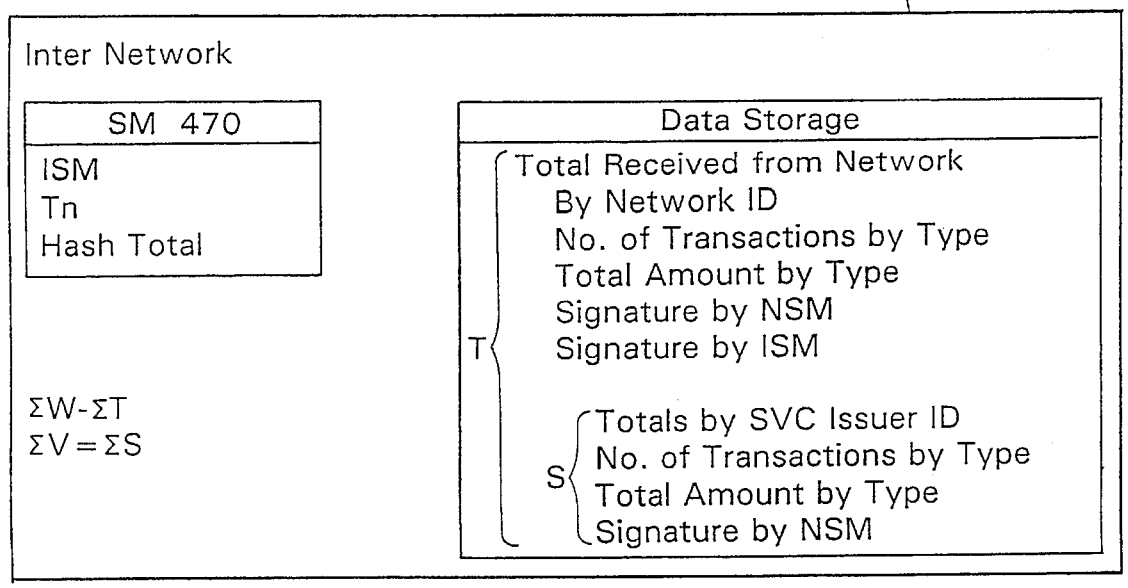
Figure 13I:
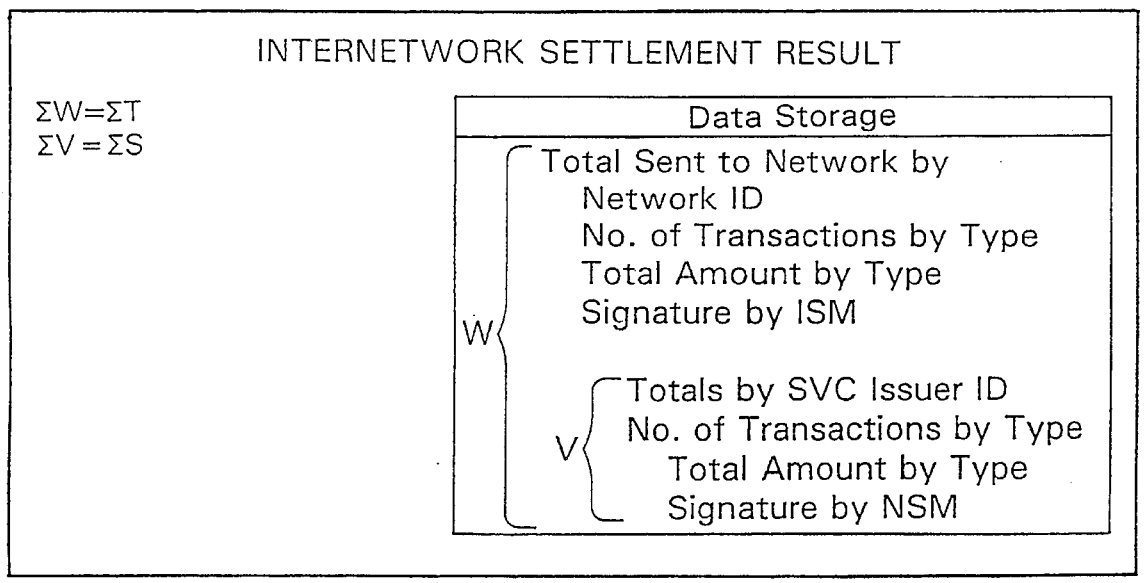

When information representative of the value stored within the collection device 424 is received by the collection system of FIG. 13C, the data structure 1310 is appended to the data structures 1304, 1308. The information within the data structure 1310 includes the security module identification DSM ID, the transaction number $T_n$ and the security module 426 transaction counter. The security module 426 of the collection system 424 contains the security module ID number, the transaction number and hash totals as well as the number of uses in storage.

Within the consolidation system 436, the data structure 1318 is appended to the data structures 1304, 1308, 1312. The data structure 1318 contains the totals for each collection as well as the ID number and transaction number. The security module 330 of the collection system 436 includes the security module identification number, the transaction number, the hash totals and the number of collection systems in storage.

From the foregoing description, it can be seen that the present invention comprises a method and apparatus for use in a transaction system for integrated circuit cards. It will be appreciated by those skilled in the art that changes could be made to the embodiment described above without departing from the broad inventive concept thereof. It is understood, therefore, that this invention is not limited to the particular embodiment disclosed, but it is intended to cover all modifications within the spirit and scope of the present invention as defined by the appended claims.

We claim:

1. A system for determining value in a stored value transaction system having a plurality of value storing transfer devices, comprising:

a first stored value transaction network including a first network consolidation device for receiving stored value information from at least one value storing transfer device of said plurality of value storing transfer devices and summarizing said received stored value information to provide a first consolidated portion of said received stored value information; wherein said value storing transfer devices comprise data encryption devices including an encryption key common to said data encryption devices in said first stored value transaction network; and a first network settlement device coupled to said first network consolidation device for receiving said first consolidated portion and performing network settlement of said first stored value transaction network in accordance with said first consolidated portion.

2. A system for determining value in a stored value transaction system having a plurality of value storing transfer devices, comprising:

a first stored value transaction network including a first network consolidation device for receiving stored value information from at least one value storing transfer device of said plurality of value storing transfer devices and summarizing said received stored value information to provide a first consolidated portion of said received stored value information;

a first network settlement device coupled to said first network consolidation device for receiving said first consolidated portion and performing network settlement of said first stored value transaction network in accordance with said first consolidated portion;

a second stored value transaction network including a second network settlement device and a second network consolidation device coupled to said second network settlement device, said second network consolidation device receiving stored value information and applying a second consolidated portion of said received stored value information to said second network settlement device; and an internetwork device coupled to said first and second network settlement devices for receiving said first and second consolidated portions from said first and second network settlement devices, wherein each of said first and second stored value transaction networks comprises a respective plurality of value storing transfer devices, each value storing transfer device having an individual data encryption device.

3. The system for determining value in a stored value transaction system of claim 2, wherein the data encryption devices of each network of said first and second networks have a common encryption key.

* * * * *